(12) United States Patent
Lyon et al.

(10) Patent No.: US 12,134,368 B2
(45) Date of Patent: *Nov. 5, 2024

(54) USER-TO-VEHICLE INTERACTION

(71) Applicant: Apple Inc., Cupertino, CA (US)

(72) Inventors: Benjamin B. Lyon, San Jose, CA (US); Donald J. Novotney, San Jose, CA (US); James J. Reuther, San Francisco, CA (US); Birju N. Shah, Redwood City, CA (US); Kurt R. Stiehl, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/380,126

(22) Filed: Oct. 13, 2023

(65) Prior Publication Data

US 2024/0034272 A1  Feb. 1, 2024

Related U.S. Application Data

(63) Continuation of application No. 17/871,777, filed on Jul. 22, 2022, now Pat. No. 11,787,368, which is a continuation of application No. 16/877,970, filed on May 19, 2020, now Pat. No. 11,465,586, which is a continuation of application No. 16/145,117, filed on Sep. 27, 2018, now abandoned.

(60) Provisional application No. 62/564,982, filed on Sep. 28, 2017.

(51) Int. Cl.
*B60R 25/24* (2013.01)
*B60R 25/01* (2013.01)

(52) U.S. Cl.
CPC ............ *B60R 25/246* (2013.01); *B60R 25/01* (2013.01); *B60R 25/245* (2013.01)

(58) Field of Classification Search
CPC ..... B60R 25/246; B60R 25/01; B60R 25/245; G05D 1/0016
See application file for complete search history.

(56) References Cited

U.S. PATENT DOCUMENTS

| | | | |
|---|---|---|---|
| 9,612,123 B1* | 4/2017 | Levinson | G06V 20/56 |
| 9,646,356 B1* | 5/2017 | Schwie | B60W 30/06 |
| 9,751,497 B2* | 9/2017 | Sanji | G07C 9/00 |
| 9,963,106 B1* | 5/2018 | Ricci | G08G 1/017 |
| 10,061,317 B2* | 8/2018 | Goldberg | G08G 1/146 |
| 10,244,094 B2* | 3/2019 | Iagnemma | G08G 1/202 |
| 10,487,564 B2* | 11/2019 | Rust | E05F 15/40 |
| 11,465,586 B1 | 10/2022 | Lyon et al. | |
| 11,787,368 B1* | 10/2023 | Lyon | B60R 25/245 340/5.61 |
| 2009/0224939 A1* | 9/2009 | Stocker | B60L 55/00 340/3.1 |

(Continued)

OTHER PUBLICATIONS

Applicant Initiated Interview Summary received for U.S. Appl. No. 16/145,117, mailed on Dec. 2, 2019, 3 pages.

(Continued)

*Primary Examiner* — Thomas D Alunkal
(74) *Attorney, Agent, or Firm* — DLA Piper LLP (US)

(57) ABSTRACT

A transit request is initiated, which requests dispatch of a vehicle to a location of the electronic device. Information, including authentication information, is received and a communication channel is established with the vehicle.

21 Claims, 9 Drawing Sheets

(56) References Cited

U.S. PATENT DOCUMENTS

| | | | |
|---|---|---|---|
| 2015/0339928 A1* | 11/2015 | Ramanujam | G06Q 10/00 |
| | | | 701/23 |
| 2016/0301698 A1 | 10/2016 | Katara et al. | |
| 2016/0306350 A1 | 10/2016 | Shim et al. | |
| 2017/0075358 A1* | 3/2017 | Zhang | G05D 1/0287 |
| 2017/0249797 A1 | 8/2017 | Elie et al. | |
| 2018/0324548 A1* | 11/2018 | Venkatraman | H04W 76/14 |
| 2019/0135229 A1* | 5/2019 | Ledvina | H04L 63/18 |

OTHER PUBLICATIONS

Applicant-Initiated Interview Summary received for U.S. Appl. No. 16/877,970, mailed on Nov. 9, 2020, 3 pages.
Final Office Action received for U.S. Appl. No. 16/877,970, mailed on Mar. 2, 2021, 8 pages.
Non-Final Office Action received for U.S. Appl. No. 16/145,117, mailed on Aug. 21, 2019, 10 pages.
Non-Final Office Action received for U.S. Appl. No. 16/877,970, mailed on Jul. 23, 2020, 8 pages.
Notice of Allowance received for U.S. Appl. No. 16/145,0117, mailed on Feb. 20, 2020, 10 pages.
Notice of Allowance received for U.S. Appl. No. 16/877,970, mailed on Jun. 8, 2022, 10 pages.
Notice of Allowance received for U.S. Appl. No. 17/871,777, mailed on Jan. 4, 2023, 10 pages.
Notice of Allowance received for U.S. Appl. No. 17/871,777, mailed on Jun. 12, 2023, 8 pages.

* cited by examiner

USER-TO-VEHICLE INTERACTION

CROSS-REFERENCE TO RELATED APPLICATIONS

This application is a continuation of U.S. Non-Provisional application Ser. No. 17/871,777, entitled "USER-TO-VEHICLE INTERACTION," filed Jul. 22, 2022, which is a continuation of U.S. Non-Provisional application Ser. No. 16/877,970, entitled "USER-TO-VEHICLE INTERACTION," filed May 19, 2020, now U.S. Pat. No. 11,465,586 issued Oct. 11, 2022, which is a continuation of U.S. Non-Provisional application Ser. No. 16/145,117, entitled "User-to-Vehicle Interaction," filed Sep. 27, 2018, which claims priority from U.S. Provisional Patent Application Ser. No. 62/564,982, entitled "User-to-Vehicle Interaction," filed Sep. 28, 2017, which are hereby incorporated by reference in their entirety for all purposes.

FIELD

The present disclosure relates generally to user-to-vehicle interaction, and more specifically to techniques for accessing a vehicle using a user device.

BACKGROUND

Autonomous vehicles do not require human drivers. Novel techniques for interaction between vehicle and passenger are helpful.

BRIEF SUMMARY

The present disclosure describes techniques for accessing a vehicle. The present disclosure also describes techniques for receiving information from passengers such as setting desired destinations and/or other vehicle controls.

In some exemplary processes, a transit request is initiated using an electronic device, such as a cellular phone. The transit request summons a vehicle towards a location of a user device. Information generated in response to the transit request is received. The information includes first authentication information and second authentication information. Third authentication information from the vehicle is received using a first wireless communication protocol. The process determines whether the third authentication information corresponds to the first authentication information. In accordance with determining that the third authentication information corresponds to the first authentication information, a wireless communication connection is established with the vehicle using a second wireless communication protocol and the second authentication information. The second wireless communication protocol is different from the first wireless communication protocol. Using the second wireless communication protocol, instructions to unlock a cabin of the vehicle are sent.

In some exemplary processes, a transit request is initiated. The transit request summons a vehicle towards a location of a user device. Information generated in response to the transit request is received, where the information includes first authentication information. Second authentication information from the vehicle is received using a first wireless communication protocol. The process determines whether the second authentication information corresponds to the first authentication information. In accordance with determining that the second authentication information corresponds to the first authentication information, instructions are sent to a second electronic device external to the vehicle using a second wireless communication protocol different from the first wireless communication protocol. The instructions, when received by the vehicle, cause a cabin of the vehicle to unlock.

In some exemplary processes, information generated in response to a transit request is received. The transit request summons the vehicle towards a location of a user device. The received information includes first authentication information. Second authentication information is received from the device using a first wireless communication protocol. The process determines whether the second authentication information corresponds to the first authentication information. In accordance with determining that the second authentication information corresponds to the first authentication information, a cabin of the vehicle is unlocked.

DETAILED DESCRIPTION

Figure 1:
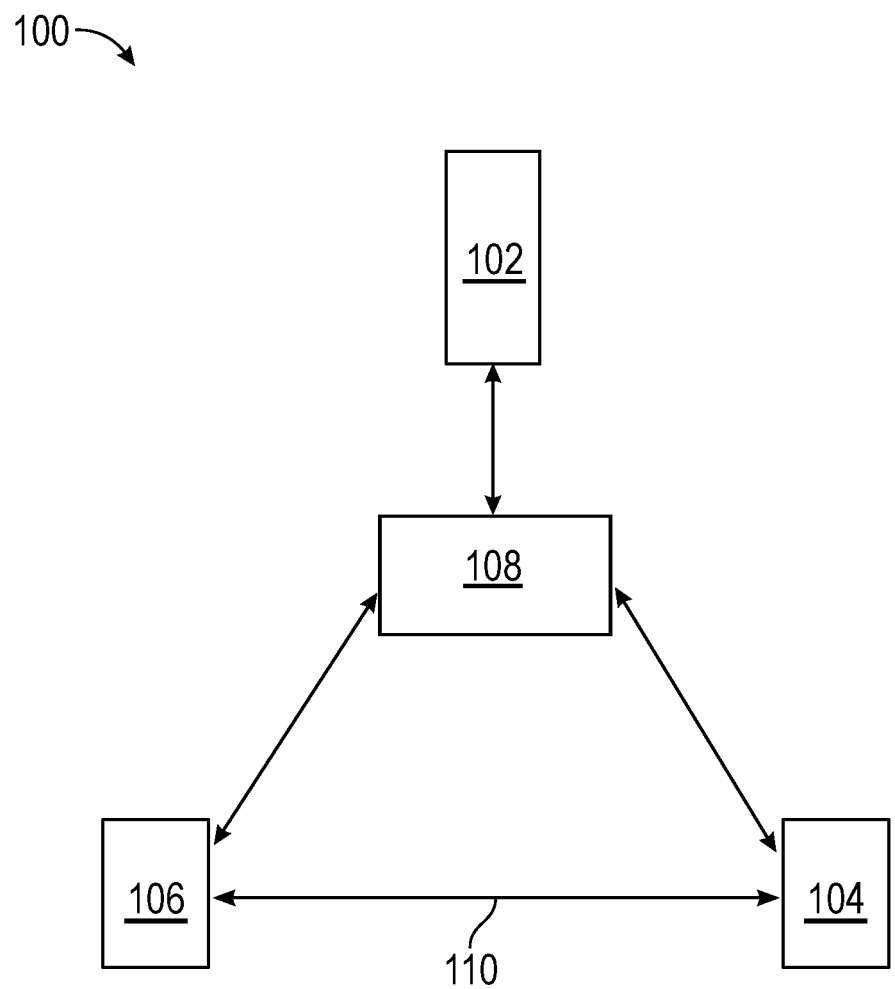
FIG. 1 illustrates an exemplary system supporting user-to-vehicle interactions, according to various examples.

The following description sets forth exemplary methods, parameters, and the like. It should be recognized, however, that such description is not intended as a limitation on the scope of the present disclosure but is instead provided as a description of exemplary embodiments.

For autonomous vehicles used to provide transit services, interactions with passengers can be complex. For example, an autonomous vehicle may need to interact with multiple passengers associated with multiple pick-up and drop-off locations and who have different preferences for vehicle settings in the passenger cabin such as climate and lighting control. In addition, the vehicle may need to interact with one or more transit service systems to coordinate transit requests and ensure that the correct person is picked-up and dropped-off at the correct location. Techniques that facilitate these interactions improve passenger experience.

The present disclosure describes various techniques for interacting with an autonomous vehicle (hereafter also referred to as "vehicle" for brevity) using a user device (e.g., an electronic device that is associated with a user/passenger). These techniques enable the user device to provide a central interface for managing various aspects of using an autonomous vehicle.

For example, the user device is used by the user to initiate a transit request and cause a vehicle to be dispatched to a pick-up location. When the vehicle arrives at the pick-up location, the user device is used by the user to authenticate the vehicle and confirm that the vehicle is the dispatched vehicle for the transit request. Additionally, the user device is used by the vehicle to authenticate that the user of user device is the same user who initiated the transit request. For example, to authenticate the vehicle and the user, the user device is placed within communication range of a communication device of the vehicle, such as a Near Field Communication (NFC) device, which causes authentication information to be automatically exchanged between the user device and the vehicle when the two are in proximity. The exchanged authentication information is used by the user device and the vehicle to authenticate the user and the dispatched vehicle. Upon successful authentication, the passenger cabin of the vehicle is unlocked to enable the user to board the vehicle.

In some examples, the user device is additionally used by the user to adjust one or more cabin settings of the vehicle or access information while on board the vehicle. For example, a secure wireless communication connection (e.g., peer-to-peer connection) is established between the user device and the vehicle. Using the established wireless communication connection, the user can adjust cabin settings or obtain an operating status of the vehicle by sending a request from the user device to the vehicle. By employing the user device as a centralized interface to manage various aspects of a transit request, a passenger's cognitive burden from handling complex user-to-vehicle interactions is reduced, as the look and feel of the centralized interface need not depend on the interior design of the particular dispatched vehicle or the user's ultimate seating position, which can result in improved passenger experience. In addition, the techniques described here can reduce the need for providing user interface systems within the vehicle (e.g., buttons, knobs, touchscreens, etc.), which can optimize the hardware requirements of the vehicle, thereby reducing vehicle mass and increasing vehicle range.

FIG. 1 illustrates exemplary system 100 supporting user-to-vehicle interactions, according to various examples. System 100 includes server system 102, vehicle 104, and user device 106 communicatively connected to each other over network 108. User device 106 is similar or the same as electronic device 200, described below with reference to FIG. 2. Vehicle 104 is similar or the same as vehicle 300, described below with reference to FIG. 3. Server system 102, vehicle 104, and user device 106 receive or send information to and from each other via network 108. Network 108 includes, for example, a local network and/or a wide area network. Server system 102, vehicle 104, and user device 106 are connected to the network 108 through wired and/or wireless connections. For example, vehicle 104 and/or user device 106 are connected to network 108 through a wireless service provider using various wireless communication protocols (e.g., GSM, LTE, etc.). In some examples, vehicle 104 and/or user device 106 are connected to network 108 over a Wi-Fi connection.

As depict by arrow 110, user device 106 and vehicle 104 are further configured to directly communicate with each other to enable direct information transfer between user device 106 and vehicle 104. In some examples, a direct wireless communication connection (e.g., over a private peer-to-peer network and not over network 108) is established between user device 106 and vehicle 104 to enable direct information transfer to occur. The direct wireless communication connection is, for example, a single-hop point-to-point wireless communication channel. In some examples, the direct wireless communication connection is established using, for example, short-range (e.g., 1-10 meter range) wireless communication protocols (e.g., Bluetoot™, Zigbee™, Infrared Data Association, etc.) or direct Wi-Fi™ communication protocols. In some examples, user device 106 and vehicle 104 are configured to directly communicate with each other using ultra-short range (e.g., less than 10 centimeter range) communication protocols, such as near-field communication protocols (e.g., NFC).

Server system 102 includes one or more processors, memory, and other components typically present in server computing devices. The non-transitory memory stores information accessible by the one or more processors, including instructions that are executed or otherwise used by the one or more processors. The instructions include, for example, instructions for processing a transit request and coordinating the interactions between user device 106 and vehicle 104 during the vehicle's pick-up, transportation, and/or drop-off of a passenger (the user) associated with user device 106. For example, vehicle 104 is part of a fleet of vehicles that is dispatched by server system 102 to a location associated with user device 106 in response to a transit request received from user device 106. In connection with the transit request, server system 102 transmits and receives information to and from vehicle 104 and user device 106. In some examples, the information transmitted or received includes location information (e.g., pick-up location, drop-off location, and current location), authentication information, notification information, or any combination thereof. In some examples, the transmitted or received information includes requests for causing vehicle 104 to perform one or more actions. Although only one vehicle and one user device is depicted in FIG. 1 for simplicity, it should be recognized that the system can include any number of vehicles and user devices.

Figure 2:
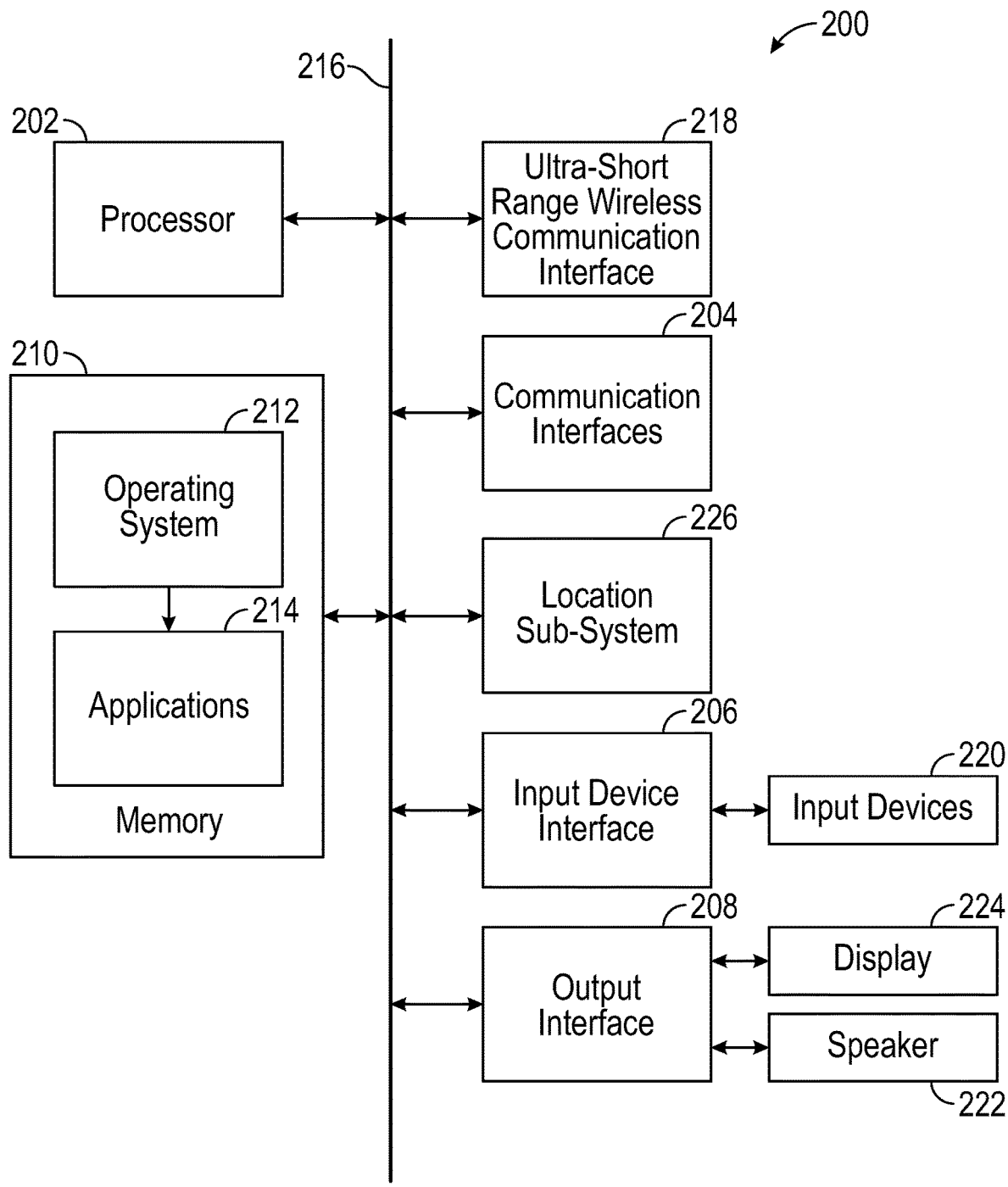
FIG. 2 illustrates an exemplary user device, according to various examples.

FIG. 2 illustrates exemplary electronic device 200, according to various examples. Device 200 includes processor 202 in communication with various other components over a system bus 216 or through a direct connection. These other components include, by way of example, one or more communication interfaces 204, ultra-short range wireless communication interface 218, input device interface 206, output interface 208, location sub-system 226, and memory 210.

As appreciated by those skilled in the art, communication interfaces 204 enable device 200 to exchange data, such as authentication information, requests, notifications, and the like with other resources including computers, data sources, storage devices, vehicles (e.g., vehicle 104), and the like, directly or over a network (e.g., network 108). For example, device 200 connects to network 108 and communicates with server system 102 and/or vehicle 104 via communication interfaces 204. In some examples, communication interfaces 204 include one or more wireless communication interfaces that enable wireless communication using short, medium, and/or long-range wireless communication protocols. Examples of short-range (e.g., 1-10 meter range) wireless communication protocols supported by communication interface 204 include, but are not limited to, Bluetooth™, Zigbee™, and Infrared Data Association (IrDA), Examples of medium-range (e.g., 30-100 meter range) wireless communication protocols supported by communication interface 204 include, but are not limited to, Wi-Fi™, and low-power radio frequency (e.g., Z-Wave™). Examples of long-range (e.g., greater than 100 meter range) wireless communication protocols supported by communication interface 204 include, but are not limited to, wireless regional area network (WRAN), and wireless network radio (cellular), such as GSM network, Long Term Evolution (LTE) network, WiMAX network, 3G network, and 4G network. In some examples, the wireless communication interfaces are configured to establish a direct wireless communication connection with another resource (e.g., vehicle 104). The direct wireless communication connection is, for example, a single-hop point-to-point wireless communication channel.

Ultra-short range wireless communication interface 218 enables device 200 to exchange data with another resource (e.g., vehicle 104) while device 200 and the other resource are positioned in close proximity to each other (e.g., less than 10 centimeters). In some examples, ultra-short range wireless communication interface 218 is part of communication interfaces 204. In some examples, ultra-short range wireless communication interface 218 includes an NFC interface to allow for close range (e.g., less than 10 centimeters) communication using an NFC wireless communication protocol. The NFC interface exists as an accessory of device 200 or is integrated as part of a chipset of device 200. The NFC interface uses one or more NFC protocols for communicating with another NFC enabled device. The protocols are used, for example, to adapt the communication speed and to designate one of the connected devices as the initiator device that controls the near field communication. In some examples, the NFC interface is used to received and/or transmit information, such as a unique identification number (UID) using NFC protocols.

The NFC interface, in some examples, is configured to operate in different NFC modes. In some examples, the NFC interface operates in "reader" mode to enable device 200 to read information from an NFC tag or another NFC enabled device. In other examples, the NFC interface operates in a card emulation mode for allowing another NFC enabled device to read information from the NFC interface. In some examples, the NFC interface is configured to operate in an active mode where device 200 generates its own radio frequency (RF) field, or in a passive mode where device 200 uses load modulation to transfer data to another device generating an RF field.

Input device interface 206, sometimes also embodied as an input/output interface, enables device 200 to obtain data input from input devices 220. Input devices 220 include, for example, a microphone, a digital pen, a touch screen, a keyboard, or the like. In addition to the exemplary components described above, output interface 208 is used for outputting information, such as audio signals or display information, to one or more output devices. For example, audio signals are provided to speaker 222, which generate corresponding audio output. Display information is provided to display 224 for display.

Location sub-system 226 is configured to obtain the location of device 200. In some examples, location sub-system 226 includes a global positioning system (GPS) receiver, which receives GPS signals. In these examples, location sub-system 226 uses the received GPS signals to determine the location of device 200. In some examples, location sub-system 226 is configured to determine the location of device 200 using information obtain from other components of device 200, such Wi-Fi™ signals, Bluetooth signals, or the like.

Processor 202 is configured to operate in accordance with programming instructions stored in a memory 210. Memory 210 generally comprises RAM, ROM, and/or other memory (e.g., non-transitory computer-readable storage medium). In some examples, a non-transitory computer-readable storage medium of memory 210 stores one or more programs for execution by processor 202, the one or more programs including instructions, which when executed by processor 202, causes device 200 to perform any of the methods or processes described herein (e.g., processes 400 and 600, described below).

Memory 210 stores operating system 212 for controlling the operation of device 200. Similarly, memory 210 also stores applications 214, or programs, for conducting various functions on device 200. For example, applications 214 and/or programs in memory 210 include instructions for performing the various techniques described below. In a specific example, applications 214 includes a transit service application configured to initiate a transit request to summon a vehicle towards a pick-up location, provide access to the vehicle, and/or control one or more functionalities of the summoned vehicle.

Figure 3:
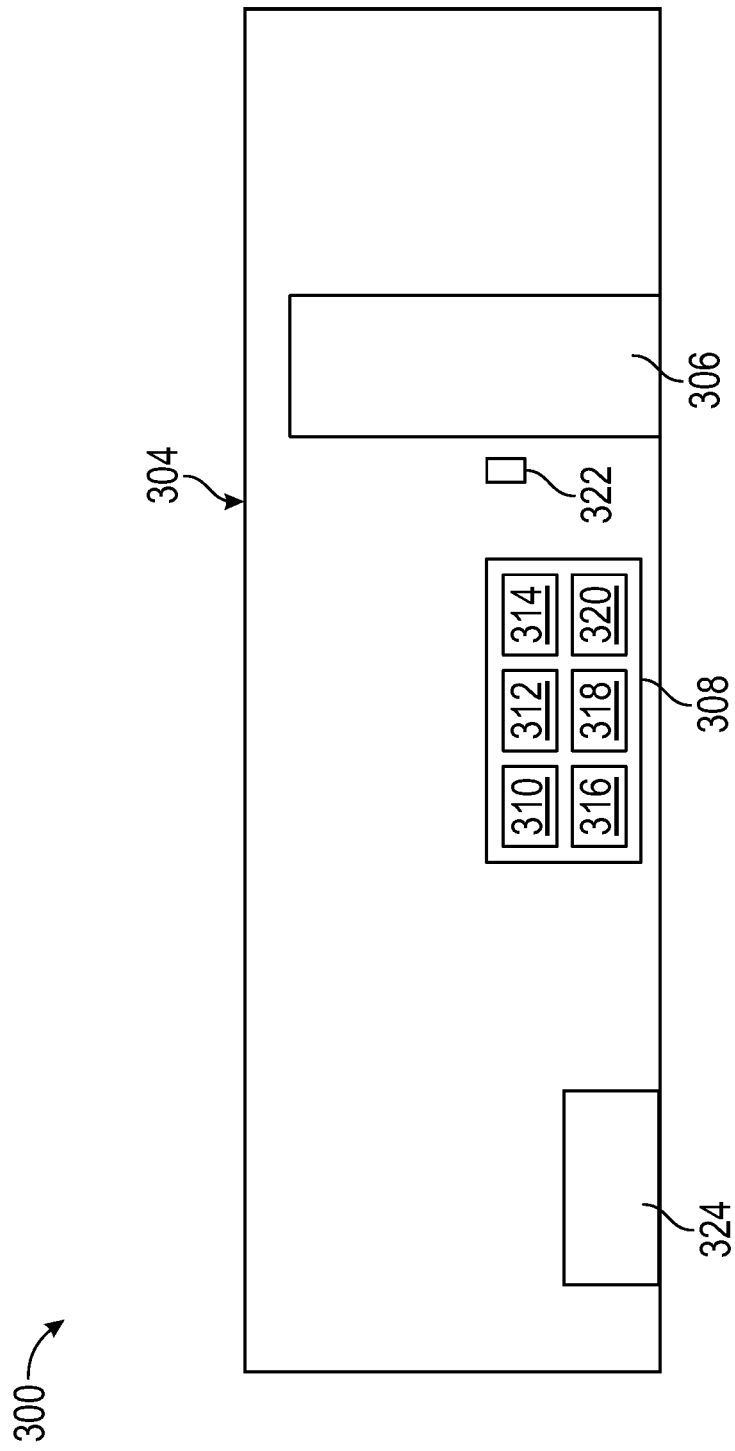
FIG. 3 illustrates an exemplary vehicle, according to various examples.

FIG. 3 illustrates exemplary vehicle 300, according to various examples. Vehicle 300 is, for example, an autonomous vehicle. Vehicle 300 includes passenger cabin 304, storage cabin 324 (e.g., trunk), and passenger door 306. In addition, vehicle 300 includes control system 308 capable of communicating with and controlling various systems of vehicle 300. Control system 308 includes one or more processors 310 in communication with various other components, which include automated driving interface 312, communication interfaces 314, sensors 316, peripheral interface 318, and memory 320.

Automated driving interface 312 communicates and controls various vehicle systems for maneuvering vehicle 300, such as the steering system, the acceleration system, the braking system, the light signaling system, and the like. In addition, automated driving interface 312 communicates with various vehicle sensors on vehicle 300 (e.g., vehicle sensors of sensors 316) to detect objects around vehicle 300 and determine a safe route to follow. The vehicle sensors include, for example, light detection and ranging (LIDAR) units, radio detection and ranging (RADAR) units, optical sensor units (e.g., cameras), and the like. Automated driving interface 312 thus enables control system 308 to, for example, steer and control the speed of vehicle 300 along a roadway while avoiding collision with objects around vehicle 300.

Communication interfaces 314 enable control system 308 to exchange data, such as transit request information, authentication information, control requests, notifications, and the like with other resources including computers, data sources, storage devices, user devices (e.g., user device 106), and the like, over a network (e.g., network 108). For example, vehicle 300 connects to network 108 and communicates with server system 102 and/or user device 106 via communication interfaces 314. In some examples, communication interfaces 414 include one or more wireless communication interfaces that enable wireless communication using short, medium, and/or long-range wireless communication protocols. In some examples, the wireless communication interfaces are configured to establish a direct wireless communication connection with another resource (e.g., user device 106). The direct wireless communication connection is, for example, a single-hop point-to-point wireless communication channel.

Communication interfaces 314 further communicate with one or more ultra-short range wireless communication devices of vehicle 300. The ultra-short range wireless communication devices enable control system 308 to exchange data with another resource (e.g., user device 106) while vehicle 300 and the other resource are positioned in close proximity to each other (e.g., less than 10 centimeters). The ultra-short range wireless communication devices include, for example, one or more NFC devices. In some examples, the NFC devices receive and/or transmit information, such as UIDs, using NFC protocols.

In the present example, vehicle 300 includes ultra-short range wireless communication device 322 positioned proximate to or at passenger door 306. In other examples, ultra-short range wireless communication device 322 can be positioned proximate to any external surface of vehicle 300 such that an NFC-enabled device (e.g., user device 106) external to vehicle is able to exchange data with ultra-short range wireless communication device 322 using an ultra-short range wireless communication protocol. In some examples, ultra-short range wireless communication device 322 is configured to be used to provide or deny access to passengers through passenger door 306. For example, ultra-short range wireless communication device 322 is configured to unlock/open passenger door 306 upon receiving data that successfully authenticates the person trying to board vehicle 300. In some examples, ultra-short range wireless communication device 322 is an NFC device. For example, ultra-short range wireless communication device 322 is a passive NFC tag or an active NFC device capable of operating in "reader" mode or "card emulation" mode.

In some examples, one or more additional ultra-short range wireless communication devices are disposed within cabin 304. For example, the additional ultra-short range wireless communication devices are disposed at one or more seat regions of cabin 304 and/or an entrance/exit region of cabin 304. In some examples, the additional ultra-short range wireless communication devices are configured to determine whether a passenger has boarded the vehicle or reached an assigned seat of the vehicle.

Sensors 316 include the vehicle sensors used by automated driving interface 312 to detect objects around vehicle 300. In addition, sensors 316 include location sensors, such as a GPS receiver, for determining the location of vehicle 300. In some examples, sensors 316 include cabin sensors to control cabin settings and monitor passengers within cabin 304. The cabin sensors include, for example, optical sensors (e.g., cameras), pressure sensors, temperature sensors, and/or infrared sensors.

Peripheral interface 318 enables control system 308 to communicate with and control various peripheral systems of vehicle 300. The peripheral systems include, for example, the seat control systems in the cabin, the media control systems in the cabin, the climate control systems, and the passenger door control system. Peripheral interface 318 thus enables control system 308 to control a position of a seat, change a setting of a media system, modify a climate control setting, and unlock/open passenger door 306.

Processor 310 is configured to operate in accordance with programming instructions stored in a memory 320. Memory 320 generally comprises RAM, ROM, and/or other memory (e.g., non-transitory computer-readable storage medium). Memory 320 stores programs containing instructions for performing various functions of vehicle 300. In some examples, a non-transitory computer-readable storage medium of memory 320 stores one or more programs for execution by processor 310, the one or more programs including instructions for performing any of the methods or processes described herein (e.g., process 800, described below).

Figure 4:
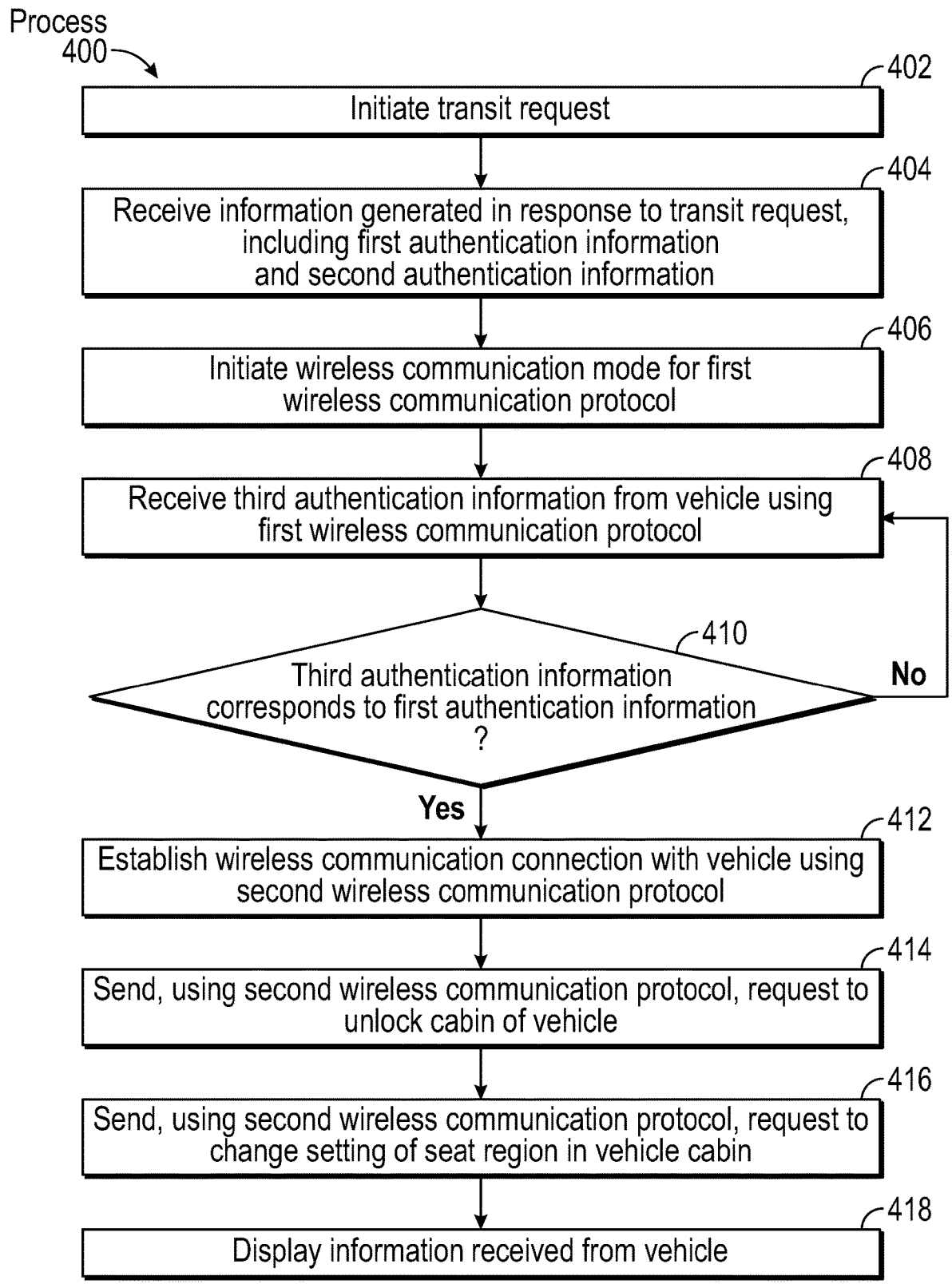
FIG. 4 illustrates an exemplary process for accessing a vehicle, according to various examples.
Figure 8:
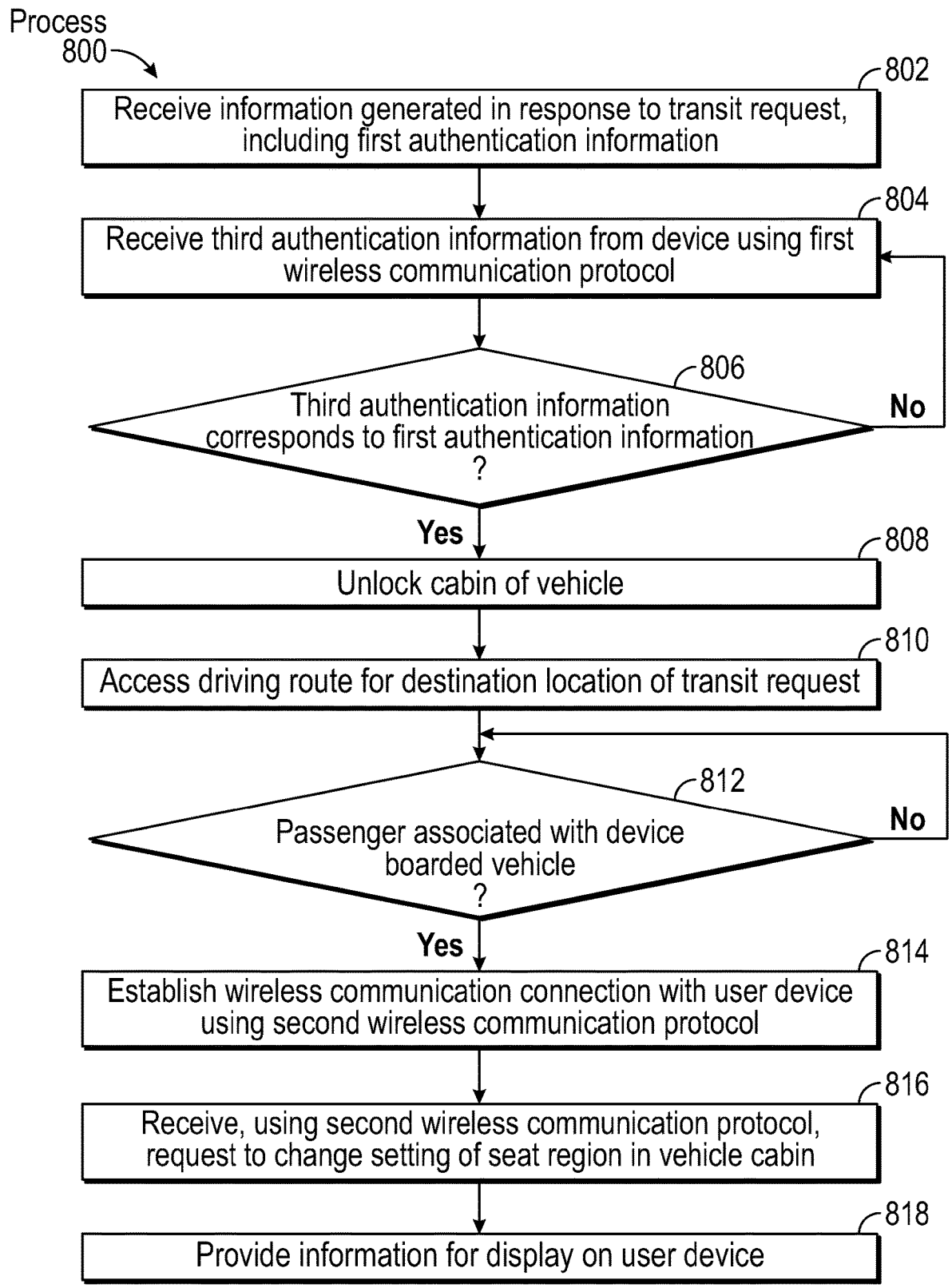
FIG. 8 illustrates an exemplary process for accessing a vehicle, according to various examples.

FIG. 4 illustrates process 400 for accessing a vehicle, according to various examples. Process 400 is performed, for example, using a user device (e.g., user device 106 or 200). In process 400, some blocks are, optionally, combined, the order of some blocks is, optionally, changed, and some blocks are, optionally, omitted. In some examples, additional operations may be performed in combination with process 400. Further, one or more operations of process 400 are performed in combination with one or more operations of processes 600 (FIG. 6) and/or 800 (FIG. 8).

Figure 5:
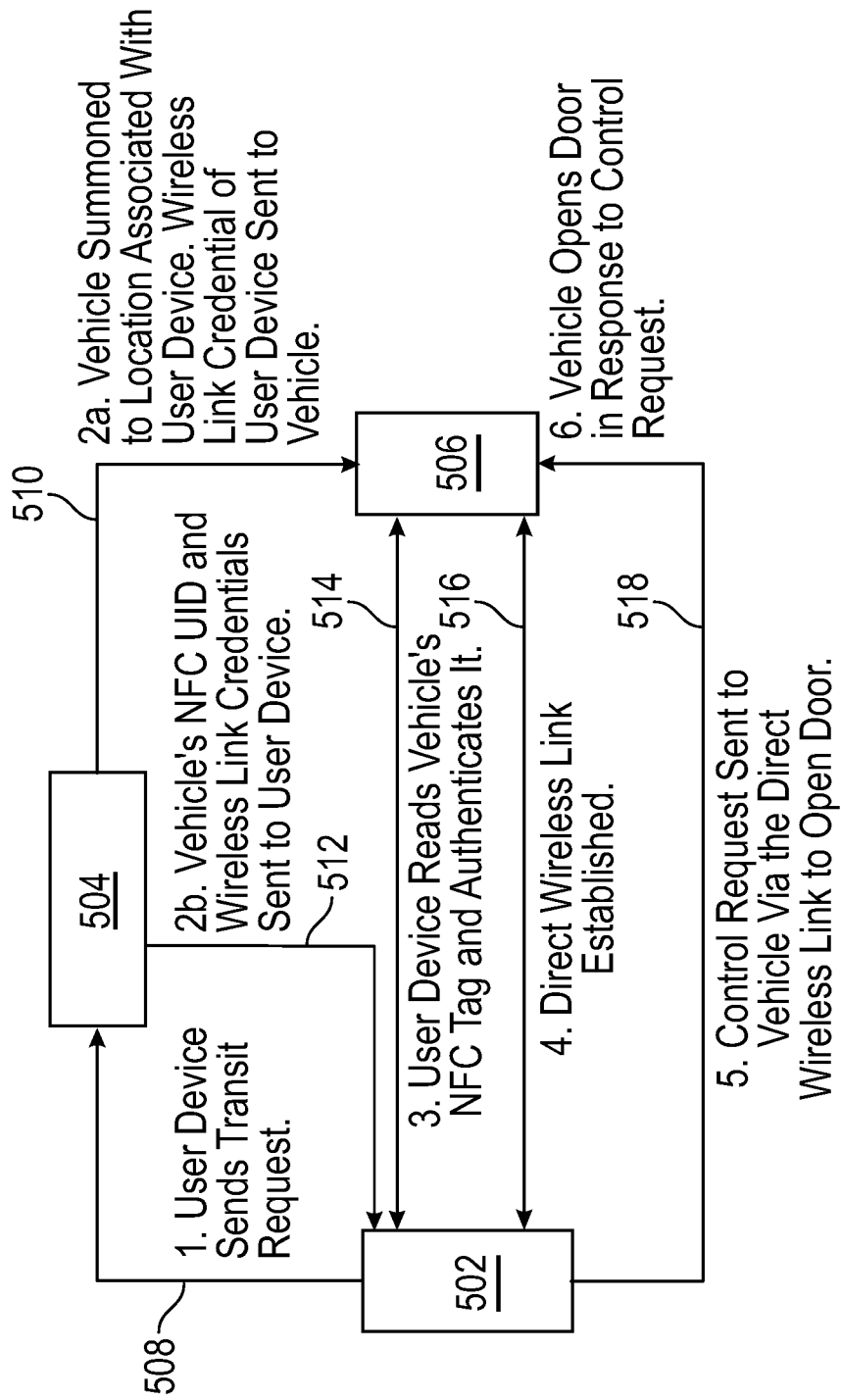
FIG. 5 is a visual representation illustrating a specific implementation of the process illustrated in FIG. 4.

Before describing process 400 in detail, an illustrative example of process 400 is provided as an overview. FIG. 5 is a visual representation of a specific implementation of process 400, according to various examples. As represented by arrow 508, user device 502 (similar or the same as user device 106 or 200) initiates a transit request to summon a vehicle to a pick-up location associated with user device 502. The transit request is sent to a server system (e.g., server system 102) via network 504 (similar or the same as network 108). As represented by arrow 510, the server system dispatches vehicle 506 (similar or the same as vehicle 104 or 300) to the pick-up location in response to the transit request. In the dispatch request to vehicle 506, the server system provides vehicle 506 with wireless link credentials of user device 502. In addition, as represented by arrow 512, the server system provides user device 502 with the NFC UID and wireless link credentials of vehicle 506. When vehicle 506 arrives at the pick-up location, user device 502 is positioned within communication range of an NFC device of vehicle 506. As represented by arrow 514, user device 502 operates as an NFC reader and reads the UID on the NFC device of vehicle 506. Having user device 502 (rather than vehicle 506) operate as the NFC reader can be advantageous because vehicle 506 would not require active NFC hardware, which can reduce costs associated with vehicles in the fleet and simplify the implementation of the process. In addition, reliance on a NFC reader that is part of a user device to read vehicle UID reduces the amount of information that is transmitted out of the user device, thereby improving security. In some examples, the read UID is encrypted and requires decrypting by user device 502 using a key received from the server system. User device 502 then authenticates vehicle 506 by comparing the UID read from vehicle 506 with the UID received from the server system. The authentication process serves to confirm that vehicle 506 is the vehicle dispatched by the server system in response to the transit request. As represented by arrow 516, user device 502 and vehicle 506 establish a direct wireless link with each other using the wireless link credentials received from the server system. Upon establishing the wireless link and successfully authenticating vehicle 506, user device 502 sends (as represented by arrow 518) a control request to vehicle 506 via the established wireless link to access a cabin of the vehicle. In response to receiving the control request from user device 502, vehicle 506 makes the cabin accessible by unlocking or otherwise allowing entry (e.g., by presenting a door handle or by opening a door). In some examples, the established direct wireless link is further used by user device 502 to control other functionalities of vehicle 506, such as seat positioning functions, cabin climate control functions, cabin lighting function, and the like. In some examples, the established wireless link is used by user device 502 to obtain and display information from vehicle 506, such as vehicle speed, cabin temperature, route information, and the like. Using the established direct wireless link to open the vehicle's door, control cabin settings, and obtain vehicle information can be desirable to enable a low latency for performing these functions. In addition, the established wireless link can be more reliable than other communication networks, such as cellular data networks, and avoids the need to transition between local and wide area networks.

Returning to FIG. 4, a detailed description of process 400 is now provided. At block 402, a transit request is initiated. The transit request summons, for example, a vehicle towards a location associated with the user device. In some examples, a user enters information via a transit service application (e.g., transit service application of applications 214) of the user device to initiate the transit request. In these examples, the transit request is initiated in response to input received from the user. Although efforts are made to reduce the transfer of user information, when a user specifically initiates a transit request, information that identifies a pick-up location and the user device (such as a one-time anonymous ID), which are needed for the vehicle to find the user and to permit user access into the vehicle, are transmitted. In some examples, the transit request is sent to a server system (e.g., server system 102) via a network (e.g., network 108) for processing. The transit request, when received by the server system, causes the server system to dispatch a vehicle (vehicle 104) to the location associated with the user device (e.g., the pick-up location specified in the transit request). In some examples, more than one vehicle is dispatched to provide the user with the flexibility of boarding one of several dispatched vehicles.

At block 404, information generated in response to the transit request is received (e.g., using communication interfaces 204). The information is generated, for example, at the server system (e.g., server system 102) that processed the transit request. The information received at block 404 includes, for example, information about the dispatched vehicle, such as its current location, estimated time of arrival, identification information (e.g., license number, visual characteristics, unique identifier, etc.), or the like. In some examples, the information received at block 404 includes confirmation information for the transit request, such as a transit request reference number, the requested pick-up location. If a user has chosen to also specify aspecific pick-up time, drop-off location, and/or cabin setting preferences, the information received at block 404 may also include confirmation of these additional user instructions.

In some examples, the information received at block 404 includes first authentication information for enabling the user device to verify that a detected vehicle corresponds to the dispatched vehicle. As will become apparent in the description below, successfully verifying that a detected vehicle corresponds to the dispatched vehicle enables the user device to obtain access to the vehicle (e.g., unlock a cabin of the vehicle). In some examples, the first authentication information includes a first authentication key and/or first identification code of the dispatched vehicle. The first authentication key is, for example, a cryptographic key or passcode used to decrypt data received from the dispatched vehicle (e.g., third authentication information received at block 410) using a first wireless communication protocol (e.g., a short-range or ultra-short range wireless communication protocol). The first identification code of the dispatched vehicle is, for example, a unique identifier (e.g., text string) representing the dispatched vehicle. In a specific example, the first identification code includes the UID of an NFC device (e.g., NFC device 322) on the dispatched vehicle. In examples where several vehicles are dispatched in response to the transit request, the first authentication information includes one or more authentication keys and one or more vehicle identification codes for enabling the user device to access any one of the dispatched vehicles.

In some examples, the received information of block 404 further includes second authentication information for enabling the user device to control one or more functionalities of the vehicle (e.g., controlling a setting of a seat region in the vehicle) using a second wireless communication protocol (e.g., a short-range or medium-range wireless communication protocol). The second wireless communication protocol is, for example, different from the first wireless communication protocol. In some examples, the second authentication information includes credentials for establishing a wireless communication connection with the dispatched vehicle using the second wireless communication protocol. The credentials include, for example, a second authentication key and/or second identification code associated with the dispatched vehicle. In a specific example, the credentials include a Bluetooth address and/or passcode associated with the dispatched vehicle, which enable the user device to establish a Bluetooth™ connection with the vehicle.

In some examples, the first authentication key of the first authentication information is one of a pair of authentication keys generated by the server system in response to receiving the transit request from the user device. The pair of authentication keys include the first authentication key and a third authentication key. The first authentication key is capable of (configured to) decrypting data encrypted by the third authentication key. The server system delivers the third authentication key to the dispatched vehicle where it is used by the vehicle to encrypt authentication information (e.g., third authentication information at block 408, described below) being sent to the user device. The server system also delivers the first authentication key to the user device as part of the first authentication information received at block 404. The user device uses the first authentication key to decrypt encrypted authentication information received from the vehicle (e.g., third authentication information received at block 408, described below). In some examples, the pair of authentication keys are uniquely generated by the server. For example, the pair of authentication keys are different from all other pairs of authentication keys previously assigned to user devices and vehicles in the fleet within a predetermined time period. In some examples, the first authentication key and the third authentication key are symmetric keys. In other examples, the first authentication key and the third authentication key are asymmetric keys (e.g., different keys).

In some examples, the first authentication key and/or third authentication key are invalidated after a predetermined amount of time (e.g., several hours or one day). For example, after the predetermined amount of time, the first authentication key would no longer be able to decrypt data encrypted using the third authentication key. The predetermined amount of time is, for example, with respect to a predetermined reference time, such as the time at which the transit request was initiated or the time at which the third authentication information was determined to correspond to the first authentication information. In some examples, the first authentication key and/or third authentication key are invalidated upon determining that the user/passenger has disembarked from the dispatched vehicle after boarding the vehicle and upon arriving at the drop-off location.

At block 406, a wireless communication mode for receiving data using the first wireless communication protocol is initiated (e.g., using communication interfaces 204). In some examples, initiating the wireless communicate mode places the user device in an operating state to transmit and/or receive data using the first wireless communication protocol. In some examples, the wireless communication mode is initiated in response to receiving input at the user device (e.g., via one of input devices 220). For example, in response to receiving the input, the application used to initiate the transit request at block 402 is loaded on the user device. Loading the application includes, for example, displaying a user interface of the application on the user device. Loading the application further causes the wireless communication mode to initiate. In a specific example, the wireless communication mode initiated at block 406 is an NFC "reader" mode initiated at the NFC interface (e.g., NFC interface of "ultra-short range wireless communication interface 218) of the user device. Upon initiating the wireless communication mode, the user device broadcasts a discovery signal (e.g., an RF field) to discovery any NFC device (e.g., NFC tag) proximate to the user device. As described in greater detail below at block 408, the discovery signal is used to detect a vehicle by, for example, detecting an NFC device of the vehicle.

At block 408, third authentication information is received (e.g., at ultra-short range wireless communication interface 218 or communication interfaces 204) from a vehicle using the first wireless communication protocol (e.g., a short-range or ultra-short range wireless communication protocol). The vehicle may or may not be the dispatched vehicle. The third authentication information is received, for example, over a single-hop point-to-point communication channel established between the vehicle and user device using the first wireless communication protocol. The third authentication information includes, for example, a third identification code of the vehicle. In particular, the third authentication information enables the user device to determine whether the vehicle corresponds to the dispatched vehicle.

In some examples, the third authentication information is received upon positioning the user device within a threshold distance from the vehicle (or a particular portion of the vehicle). The threshold distance corresponds to the communication range of the first wireless communication protocol. In a specific example where the first wireless communication protocol is the NFC protocol, the third authentication information is received from the vehicle upon positioning the user device within approximately 10 centimeters or less from an NFC device (e.g., NFC device 322) of the vehicle.

In some examples, block 408 includes performing a handshake procedure with the vehicle using the first wireless communication protocol. In the present example, the user device is the initiator of the handshake procedure and the vehicle is the target of the handshake procedure. The handshake procedure includes, for example, detecting the vehicle (e.g., detecting an NFC device of the vehicle) using the first wireless communication protocol. For example, as described in block 406, a discovery signal is broadcasted by a transmitting antenna of the user device in the region surrounding the user device. In some examples, the vehicle is detected based on one or more properties associated with generating the discovery signal. In one such example, the impedance of the transmitting antenna (e.g., transmitting antenna of an NFC interface of the user device) used to broadcast the discovery signal is monitored. When the user device is brought within a threshold proximity of a receiver antenna of the vehicle (e.g., receiver antenna of an NFC device of the vehicle), the impedance of the transmitting antenna decreases by virtue of coupling with the receiver antenna of the vehicle. If the impedance decreases below a predetermined threshold value, the vehicle is detected. It should be recognized that other related properties can similarly be used to detect the vehicle, such as the voltage across the transmitting antenna, the current drawn by the transmitting antenna, and the amount of frequency shift in the discovery signal.

In some examples, the vehicle is detected based on a response signal returned from the vehicle in response to the discovery signal. For example, the vehicle receives the discovery signal from the user device and in response, transmits a response signal back to the user device. In these examples, the user device detects the vehicle upon receiving the response signal from the vehicle. In some examples, the response signal includes connectivity information related to the vehicle. The connectivity information can be used to facilitate the completion of the handshake procedure. In some examples, the response signal does not include the third authentication information.

In some examples, in response to detecting the vehicle, the user device requests the third authentication information from the vehicle using the first wireless communication protocol. In some examples, the request specifies properties of the first wireless communication protocol for sending the third authentication information to the user device. The properties include, for example, the communication mode, the transfer speed, or the like. In response to receiving the request for the third authentication information, the vehicle sends the third authentication information to the user device according to the specified properties. The third authentication information is then received by the user device.

As briefly described above, the third authentication information includes a third identification code of the detected vehicle. In a specific example, the third identification code is a UID that is read from an NFC device of the detected vehicle. In some examples, the third authentication information is encrypted using a third authentication key (e.g., cryptographic key or passcode), which restricts access to the third identification code of the vehicle. By way of example, the NFC device of the detected vehicle includes an encryption engine, which uses the third authentication key to encrypt the UID of its NFC device. In this example, the third authentication information includes the encrypted UID generated using the third authentication key. In some examples, the third authentication key is a static key stored at the vehicle. In other examples, the third authentication key is generated by the server system in response to a transit request.

At block 410, a determination is made (e.g., using transit service application of application 214) as to whether the third authentication information received at block 408 corresponds to the first authentication information. The determination serves to establish whether or not the detected vehicle corresponds to the dispatched vehicle. For example, determining that the third authentication information corresponds to the first authentication information establishes that the detected vehicle corresponds to the dispatched vehicle. Conversely, determining that the third authentication information does not correspond to the first authentication information establishes that the detected vehicle does not correspond the dispatched vehicle.

As discussed above, in some examples, the first authentication information received at block 404 includes a first identification code of the dispatched vehicle (e.g., UID from the NFC device of the dispatched vehicle) and the third authentication information received at block 410 includes a third identification code of the detected vehicle (e.g., UID that is read from the NFC device of the detected vehicle). In these examples, block 410 includes determining whether the third identification code of the detected vehicle matches the first identification code of the dispatched vehicle. If the third identification code of the detected vehicle is determined to match the first identification code of the dispatched vehicle, the third authentication information is determined to correspond to the first authentication information. Conversely, if the third identification code of the detected vehicle is determined not to match the first identification code of the dispatched vehicle, the third authentication information is determined not to correspond to the first authentication information.

In examples where the third authentication information is encrypted, block 410 includes using the first authentication information to attempt to decrypt the third authentication information. For example, the first authentication key included in the first authentication information is used to decrypt the third authentication information. If the third authentication information is successfully decrypted using the first authentication key, the third authentication information is determined to correspond to the first authentication information. Conversely, if the third authentication information is not successfully decrypted using the first authentication key, the third authentication information is determined not to correspond to the first authentication information.

In accordance with determining that the third authentication information does not correspond to the first authentication information, process 400 returns back to block 408 where authentication information is, for example, received from another vehicle and used to authenticate the other vehicle. Additionally, in some examples, upon determining that the third authentication information does not correspond to the first authentication information, a notification is generated for display on the user device. The notification is, for example, an error notification indicating that the detected vehicle is not the dispatched vehicle. In some examples, the notification includes information regarding the dispatched vehicle, such as identification information, location information, or estimated time of arrival of the dispatched vehicle. The information serves to assist the user in locating and identifying the dispatched vehicle.

In accordance with determining that the third authentication information corresponds to the first authentication information, one or more of blocks 412-418 are performed. In some examples, one or more of blocks 412-418 are performed automatically upon determining that the third authentication information corresponds to the first authentication information and without requiring further input from the user. In some examples, the operations of one or more of blocks 412-418 are performed prior to block 408 or 410.

At block 412, a wireless communication connection with the vehicle is established using a second wireless communication protocol (e.g., using communication interfaces 204). The second wireless communication protocol is, for example, different from the first wireless communication protocol. In some examples, the second wireless communication protocol is a short-range or medium range wireless communication protocol. Establishing the wireless communication connection includes, for example, performing a handshake procedure with the vehicle, which includes exchanging connection properties, such as connection address, connection credentials, or the like, between the vehicle and the user device, for example. In some examples, the wireless communication connection is established using the second authentication information received at block 404. For example, the second authentication information includes credentials used to establish the wireless communication connection with the vehicle. In other examples, the wireless communication connection is established using the first authentication information.

The wireless communication connection is initiated either by the user device or the vehicle. In some examples, the established wireless communication connection is a direct wireless communication connection (e.g., peer-to-peer connection) between the user device and the vehicle. By way of example, the established wireless communication connection is a single-hop, point-to-point wireless communication channel between the user device and the vehicle using the second wireless communication protocol.

In some examples, block 412 is performed prior to block 408 or 410. For example, prior to the operations of block 408 or 410, the user device detects the vehicle (or vice versa) using a discovery signal of the second wireless communication protocol. Detecting the user device or vehicle initiates the handshake procedure using the second wireless communication protocol and causes the wireless communication connection to be established between the user device and the vehicle.

At block 414, a request to unlock a cabin of the vehicle is sent (e.g., from communication interfaces 204) to the vehicle using the second wireless communication protocol. More specifically, the request to unlock the cabin is sent over the established wireless communication connection of block 412 using the second wireless communication protocol. The request includes, for example, a control signal or instructions, which when received by the vehicle, causes the vehicle to unlock the cabin. In some examples, the cabin is the passenger cabin (passenger cabin 304) and the request causes a door (e.g., passenger door 306) of the passenger cabin to unlock and/or open. In other examples, the cabin is a storage cabin (e.g., storage cabin 324) of the vehicle and the request causes an access point to the storage cabin to unlock and/or open. In some examples, the request to unlock the cabin is not sent until after it is determined at block 410 that the third authentication information corresponds to the first authentication information. For example, the user device is restricted access to any functionality of the vehicle until after it is determined at block 410 that the third authentication information corresponds to the first authentication information.

At block 416, a request is sent (e.g., from communication interfaces 204) to the vehicle using the second wireless communication protocol. The request is, for example, a control request to change a setting of a seat region in the cabin of the vehicle. Similar to block 414, the request is sent over the established wireless communication connection of block 412 and using the second wireless communication protocol. In some examples, the setting being changed is a seat position setting of the seat region, a light setting of the seat region, or a climate control setting of the seat region. In some examples, the setting being changed is a setting of a media device in the seat region. The request, when received by the vehicle, causes the setting of the seat region to change in accordance with the control request.

In some examples, the request to change a setting of the seat region is sent in response to input received from the user. The input is received, for example, via an input device (e.g., one of input devices 220) of the user device. In some examples, the input includes gesture input received via a user interface displayed on a touchscreen of the user device.

In some examples, block 416 includes providing one or more predefined passenger cabin settings associated with the user device to the vehicle. The predefined passenger cabin settings are sent, for example, over the established wireless communication connection of block 412 and using the second wireless communication protocol. In some examples, the predefined passenger cabin settings are automatically sent, consistent with the user's instruction or approval, to the vehicle by the user device upon determining that the third authentication information corresponds to the first authentication information at block 410 and without further input from the user. The predefined passenger cabin settings are, for example, user preferences associated with a user profile on the user device. In some examples, the predefined passenger cabin settings include one or more of a seat position setting, a light setting, a climate control setting, and a media device setting that reflect the preferences associated with a user profile on the user device. The predefined passenger cabin settings, when received by the vehicle, cause the vehicle to apply the predefined passenger cabin settings to a seat region of the cabin associated with the transit request (e.g., the seat region assigned to the user/passenger of the transit request).

In some examples, the user device is restricted from changing any settings in the cabin of the vehicle until it is determined that a user/passenger associated with the user device has boarded the vehicle. For example, the user device permits a request to be sent to the vehicle to change a setting of a seat region or to apply predefined passenger cabin settings only after it is determined that the user/passenger has boarded the vehicle. Similarly, in some examples, the vehicle changes a setting of a seat region or applies predefined passenger cabin settings only after it is determined that the user/passenger associated with the user device has boarded the vehicle. In some examples, upon determining that the user/passenger has boarded the vehicle, one or more functions of the vehicle other than unlocking the cabin of the vehicle are accessible to the user device using the second wireless communication protocol.

In some examples, the user/passenger is determined to have boarded the vehicle based on information obtained from one or more sensors in the passenger cabin of the vehicle. For example, information from infrared sensors and/or pressure sensors at an entrance or seat region of the vehicle are used to determine whether the user/passenger has passed through the entrance of the vehicle or reached a seat region of the vehicle. In some examples, image data from one or more image sensors in the passenger cabin is used to determine whether the user/passenger has boarded the vehicle. For example, image recognition is performed using the image data to determine whether the user/passenger is inside the passenger cabin or whether the number of passengers in the passenger cabin corresponds to the user/passenger having entered the cabin.

In some examples, a communication device (e.g., NFC device) disposed (e.g., mounted) within the cabin of the vehicle is used to determine whether the user/passenger has boarded the vehicle. The determination is based on, for example, detecting a wireless communication interaction between the communication device and the user device. In some examples, the communication device is disposed along an aisle of the cabin, an entrance/exit region, or at a seat region of the vehicle. In some examples, the communication device is separate from a communication device of the vehicle used to provide the third authentication information at block 408.

At block 418, information received from the vehicle is displayed. For example, information regarding a current transit route of the vehicle or an operating status of the vehicle is received over the established wireless communication connection of block 412 using the second wireless communication protocol. Information regarding the current transit route of the vehicle includes, for example, the planned route that the vehicle is taking, the current location of the vehicle with respect to the planned route, the remaining distance to the drop-off location, the number of remaining stops until the drop-off location, the estimated time of arrival to the drop-off location, or the like. Information regarding the operating status of the vehicle includes, for example, the speed, the temperature within the passenger cabin, or the like.

In some examples, the information from the vehicle is provided to the user device in response to a request from the user device. In other examples, the information from the vehicle is not information requested by the user device. For example, the information is provided automatically to the user device on a periodic basis. Upon receiving the information from the vehicle (e.g., at communication interfaces 204), the user device displays the information on a display (e.g., display 224) of the user device.

Figure 6:
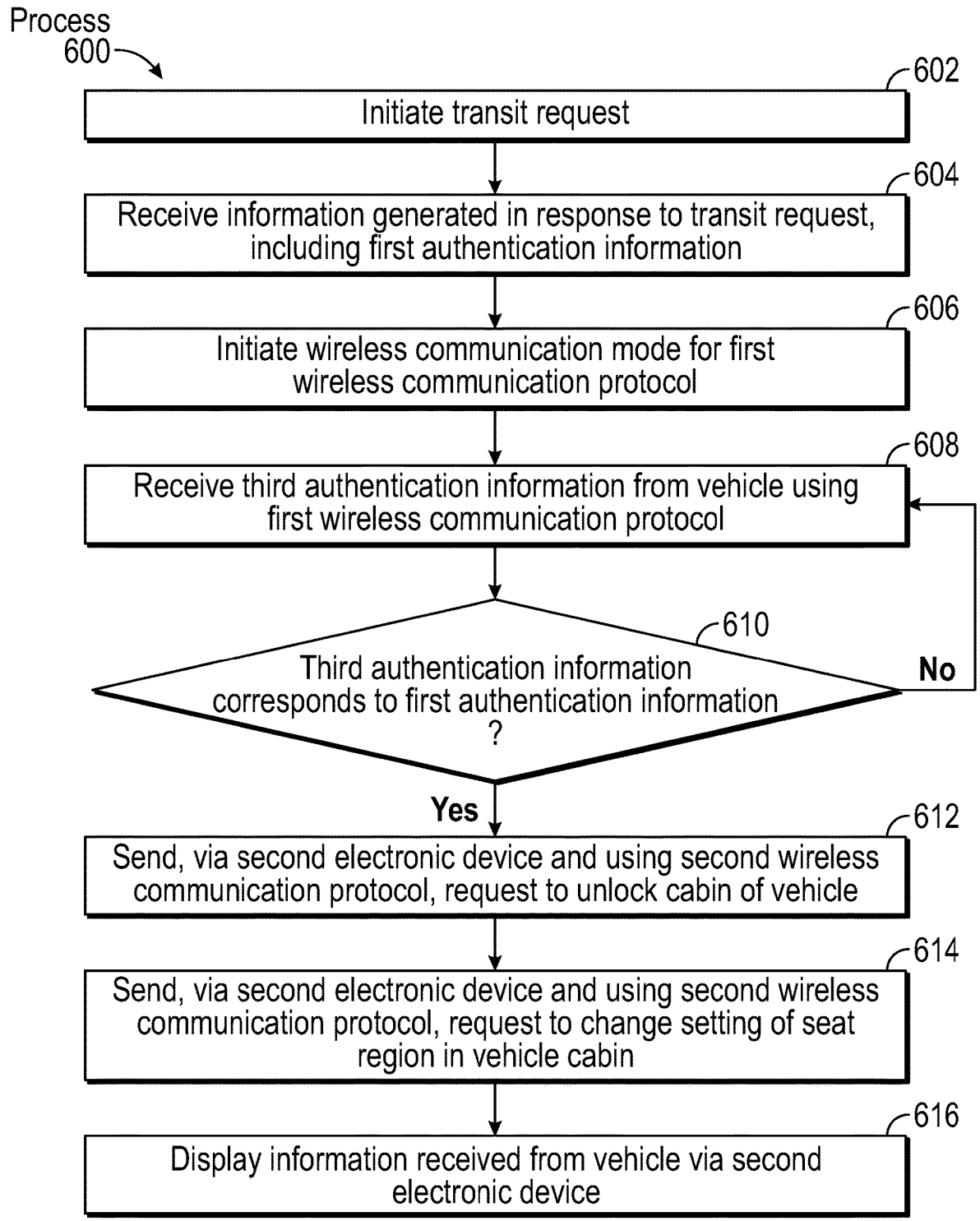
FIG. 6 illustrates an exemplary process for accessing a vehicle, according to various examples.

FIG. 6 illustrates process 600 for accessing a vehicle, according to various examples. Process 600 is performed, for example, using a user device (e.g., user device 200). In process 600, some blocks are, optionally, combined, the order of some blocks is, optionally, changed, and some blocks are, optionally, omitted. In some examples, additional operations may be performed in combination with process 600. Further, in some examples, one or more operations of process 600 are performed in combination with one or more operations of processes 400 (FIG. 4) and/or 800 (FIG. 8).

Figure 7:
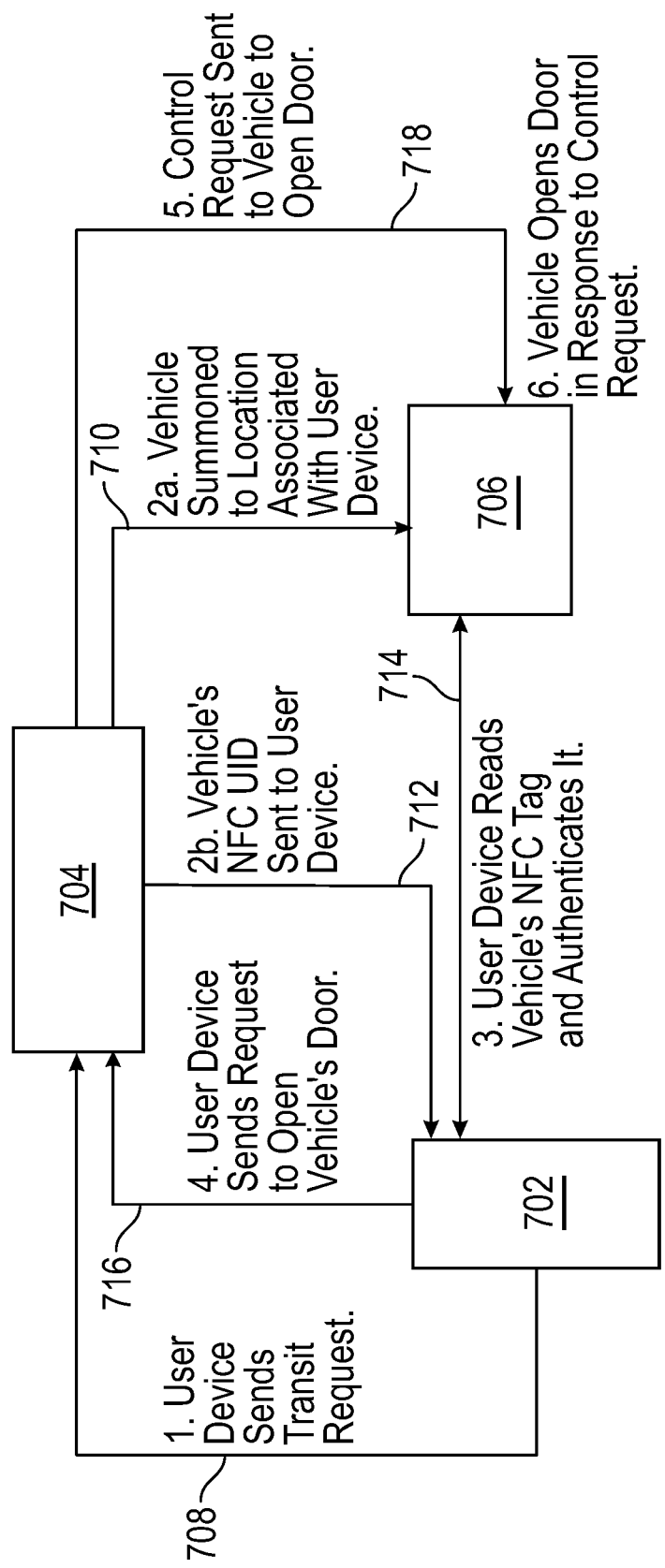
FIG. 7 is a visual representation illustrating a specific implementation of the process illustrated in FIG. 6.

Before describing process 600 in detail, an illustrative example of process 600 is provided as an overview. FIG. 7 is a visual representation of a specific implementation of process 600, according to various examples. As represented by arrow 708, user device 702 (similar or the same as user device 106 or 200) initiates a transit request to summon a vehicle to a pick-up location associated with user device 702. The transit request is sent to, for example, a server system (e.g., server system 102) via network 704 (similar or the same as network 108). As represented by arrow 710, the server system dispatches vehicle 706 (similar or the same as vehicle 104 or 300) to the pick-up location in response to the transit request. In addition, as represented by arrow 712, the server system provides user device 702 with the NFC UID of vehicle 706. When vehicle 706 arrives at the pick-up location, user device 702 is positioned within communication range of an NFC device of vehicle 706. As represented by arrow 714, user device 702 operates as the NFC reader and reads the UID on the NFC device of vehicle 706. Having user device 702 (rather than vehicle 706) operate as an NFC reader can be advantageous because vehicle 706 would not require active NFC hardware, which can reduce costs associated with vehicles in the fleet and simplify the implementation of the process. In addition, reliance on a NFC reader that is part of a user device to read vehicle UID reduces the amount of information that is transmitted out of the user device, thereby improving security. In some examples, the read UID is encrypted and requires decrypting by user device 702 using a key received from the server system. User device 702 authenticates vehicle 706 by comparing the UID read from vehicle 706 with the UID received from the server system. The authentication process serves to confirm that vehicle 706 is the vehicle dispatched by the server system in response to the transit request. Upon successfully authenticating vehicle 706, user device 702 sends a request to the server system via network 704 to unlock and/or open the door of vehicle 706, as represented by arrow 716. In response to receiving the request from user device 702, the server system sends, as represented by arrow 718, instructions to vehicle 706 via network 704 to access a cabin of the vehicle (e.g., unlock/open the vehicle's door). Vehicle 706 then makes the cabin accessible by unlocking or otherwise allowing entry (e.g., by presenting a door handle or by opening a door) in response to receiving the instructions. In some examples, user device 702 controls other functionalities of vehicle 706 by sending corresponding requests to the server system. Similarly, vehicle 706 sends vehicle information to user device via the server system. Although directing interactions between user device 702 and vehicle 706 via the server system can increase latency, it can also reduce the hardware requirements of vehicle 706. For example, vehicle 706 would not require additional hardware for enabling a direct wireless link to be established with user device 702. This can be desirable for further reducing costs associated with vehicles in the fleet and simplifying implementation of the process.

Returning to FIG. 6, a detailed description of process 600 is now provided. At block 602 a transit request is initiated. The transit request summons a vehicle towards the location of the user device. Block 602 is similar or the same as block 402, described above.

At block 604, information generated in response to the transit request of block 602 is received. In some examples, the received information include first authentication information. Block 604 is similar or the same as block 404, described above. In some examples, the received information does not include second authentication information used to establish a direct wireless communication connection with the dispatched vehicle using the second wireless communication protocol.

At block 606, a wireless communication mode for receiving data using the first wireless communication protocol is initiated. In some examples, block 606 includes receiving input from a user. In response to receiving the input, a user interface associated with the transit request is displayed and the wireless communication mode is initiated. Block 606 is similar or the same as block 406, described above.

At block 608, third authentication information is received from a vehicle using the first wireless communication. Block 608 is similar or the same as block 408, described above.

At block 610, a determination is made as to whether the third authentication information corresponds to the first authentication information. Block 610 is similar or the same as block 410, described above.

In accordance with determining that the third authentication information does not correspond to the first authentication information, process 600 returns back to block 608 where authentication information is, for example, received from another vehicle and used to authenticate the other vehicle. Additionally, in some examples, upon determining that the third authentication information does not correspond to the first authentication information, a notification is generated for display on the user device. The information serves to assist the user in locating and identifying the dispatched vehicle.

In accordance with determining that the third authentication information corresponds to the first authentication information, one or more of blocks 612-616 are performed. In some examples, one or more of blocks 612-616 are performed automatically upon determining that the third authentication information corresponds to the first authentication information and without requiring further input from the user. In some examples, one or more of blocks 612-616 are performed before block 608 or 610.

At block 612, a request to unlock a cabin of the vehicle is sent (e.g., using communication interfaces 204) to a second electronic device (e.g., server system 102) external to the vehicle using a second wireless communication protocol. The request is sent over a network (e.g., network 108) to which the user device, the second electronic device, and the dispatched vehicle are connected. In some examples, the second wireless communication protocol is different from the first wireless communication protocol. In some examples, the second wireless communication protocol is a medium-range or long-range wireless communication protocol. In some examples, the second wireless communication protocol is the same wireless communication protocol used to send the transit request at block 602. In some examples, sending the request to the second electronic device causes a cabin of the vehicle to unlock. Specifically, the request includes instructions for causing the cabin of the vehicle to unlock. In some examples, the cabin is the passenger cabin of the vehicle and sending the instructions cause a door of the passenger cabin to unlock and/or open. In other examples, the cabin is a storage cabin (e.g., storage cabin 324) of the vehicle and sending the instructions causes an access point to the storage cabin to unlock and/or open. In some examples, the request, when received by the second electronic device, causes the second electronic device to send corresponding instructions to the dispatched vehicle via the network. The instructions include instructions to unlock the cabin of the dispatched vehicle. The instructions, when received by the vehicle, causes the dispatched vehicle to unlock its cabin.

In some examples, the request to unlock the cabin of the vehicle is not sent to the second electronic device until after it is determined at block 610 that the third authentication information corresponds to the first authentication information. For example, the user device restricts requests to control one or more functionalities of the vehicle from being sent to the second electronic device until after it is determined at block 610 that the third authentication information corresponds to the first authentication information.

At block 614, a request to change a setting of a seat region in the cabin of the vehicle is sent (e.g., using communication interfaces 204) to the second electronic device using the second wireless communication protocol. Block 614 is similar to block 416, described above, except that, for example, the request of block 614 is sent to the second electronic device rather than directly to the vehicle over a direct wireless communication connection. The request of block 614, when received by the second electronic device, causes the second electronic device to send instructions to the vehicle. The instructions include instructions to change a setting of a seat region in the cabin. The instructions, when received by the vehicle, causes the vehicle to change a setting of a seat region in the cabin in accordance with the request from the user device.

In some examples, block 614 includes providing one or more predefined passenger cabin settings associated with the user device to the vehicle. In some examples, the predefined passenger cabin settings are sent, consistent with the user's instruction or approval, from the user device to the vehicle via the second electronic device. In other examples, user device sends a request to the second electronic device to provide the predefined passenger cabin settings to the vehicle. In these examples, the request, when received by the second electronic device, causes the second electronic device to send the predefined passenger cabin settings to the vehicle. In some examples, the predefined passenger cabin settings are automatically provided to the vehicle by the user device upon determining that the third authentication information corresponds to the first authentication information at block 610 and without further input from the user. The predefined passenger cabin settings, when received by the vehicle, cause the vehicle to apply the predefined passenger cabin settings to a seat region of the cabin associated with the transit request.

In some examples, the user device is restricted from changing or applying any settings to the cabin of the vehicle until it is determined that the user/passenger associated with the user device has boarded the vehicle. For example, the user device permits requests to be sent to the second electronic device to change a setting of a seat region of the vehicle or to apply predefined passenger cabin settings to the vehicle only after it is determined that the user/passenger has boarded the vehicle. Similarly, in some examples, the vehicle changes a setting of a seat region or applies predefined passenger cabin settings in response to instructions from the second electronic device only after it is determined that the user/passenger associated with the user device has boarded the vehicle. Upon determining that the user/passenger has boarded the vehicle, one or more functions of the vehicle (other than the function of unlocking the cabin) can be controlled by the user device by sending requests to the second electronic device. The techniques described in block 416 above for determining whether or not the user/passenger has boarded the vehicle can similarly be applied to block 614.

At block 616, information received from the vehicle is displayed. Block 616 is similar to block 418, described above, except that the information is received from the vehicle via the second electronic device rather than directly from the vehicle over an established wireless communication connection. For example, the information is first sent from the vehicle to the second electronic device over the network (e.g., network 108). The second electronic device then sends the information to the user device over the network using the second wireless communication protocol. Upon receiving the information (e.g., at communication interfaces 204), the user device displays the information on a display (e.g., display 224) of the user device.

FIG. 8 illustrates process 800 for providing access to a vehicle, according to various examples. Process 800 is performed, for example, using a vehicle (e.g., vehicle 300). In process 800, some blocks are, optionally, combined, the order of some blocks is, optionally, changed, and some blocks are, optionally, omitted. In some examples, additional operations may be performed in combination with process 800. Further, in some examples, one or more operations of process 800 are performed in combination with one or more operations of processes 400 (FIG. 4) and/or 600 (FIG. 6).

Figure 9:
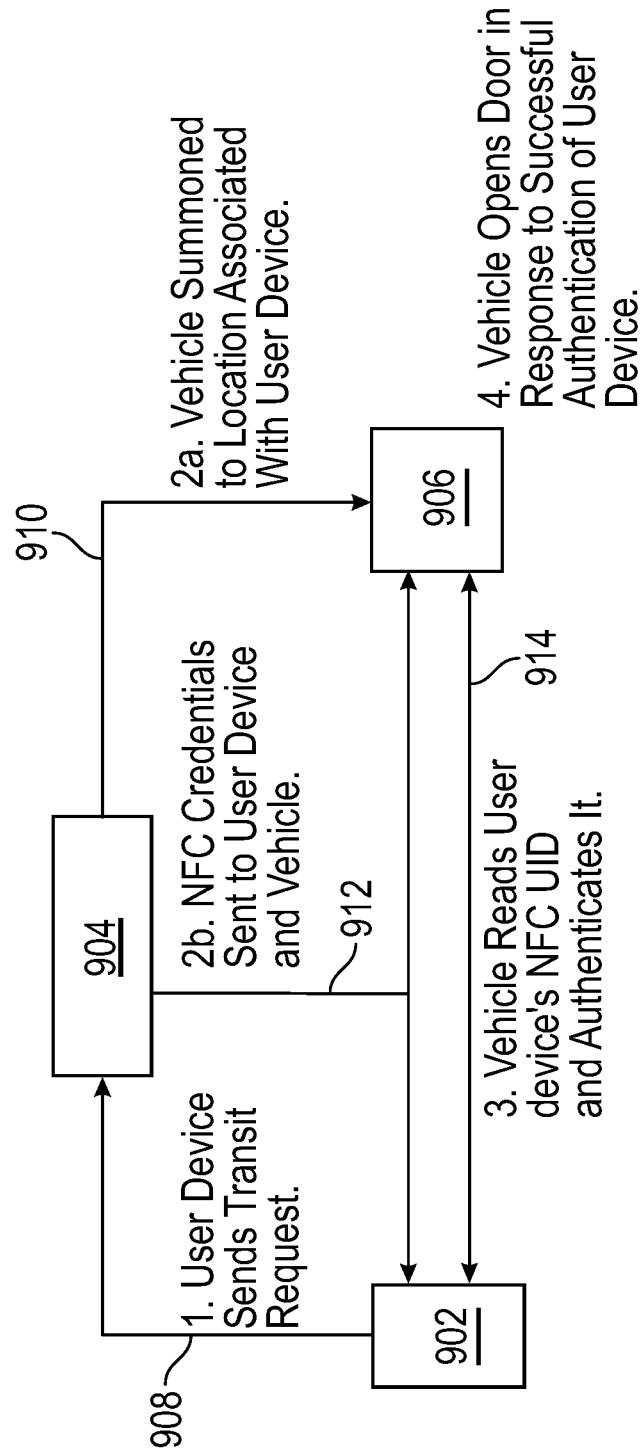
FIG. 9 is a visual representation illustrating a specific implementation of the process illustrated in FIG. 8.

Before describing process 800 in detail, an illustrative example of process 800 is provided as an overview. FIG. 9 is a visual representation of a specific implementation of process 800, according to various examples. As represented by arrow 908, user device 902 (similar or the same as user device 106 or 200) initiates a transit request to summon a vehicle to a pick-up location associated with user device 902. The transit request is sent to, for example, a server system (e.g., server system 102) via network 904 (similar or the same as network 108). As represented by arrow 910, the server system dispatches vehicle 906 (similar or the same as vehicle 104 or 300) to the pick-up location in response to the transit request. In addition, as represented by arrow 912, the server system provides corresponding NFC credentials to user device 902 and vehicle 906. When vehicle 906 arrives at the pick-up location, user device 902 is positioned within communication range of an NFC reader of vehicle 906. User device 902 operates as an NFC tag and contains an NFC UID according to the NFC credentials provided to user device 902 by the server system. In some examples, user device 902 encrypts the UID using an encryption key in the NFC credentials provided by the server system. As represented by arrow 914, the NFC reader of vehicle 906 reads the UID from user device 902. In examples where the read UID is encrypted by user device 902, vehicle 906 decrypts the UID using a decryption key provided in the NFC credentials received from the server system. Vehicle 906 authenticates user device 902 by comparing the UID read from user device 902 with the UID in the NFC credentials that vehicle 906 received from the server system. The authentication process serves to confirm that user device 902 is the user device that initiated the transit request. Upon successfully authenticating user device 902, vehicle 906 provide access to a cabin of the vehicle. For example, vehicle 906 unlocks/opens its passenger door. Having vehicle 906 (rather than user device 902) operate as the NFC reader and unlock/open its door upon successful authentication is desirable because it enables the process of unlocking/opening the vehicle door to occur with low latency, which enables the user/passenger to board vehicle 906 quickly. In particular, the process of unlocking/opening the vehicle door does not require establishing a separate wireless link between the vehicle 906 and user device 902 or routing requests through a second electronic device. In addition, the unlocking process is robust as it does not depend on the reliability of a wireless link or network connection separate from the NFC-based interaction. In some examples, after unlocking/opening the vehicle door, vehicle 906 establishes a direct wireless link with user device 902 using wireless link credentials received from the server system. In these examples, the direct wireless link is used by user device 902 to control certain functionalities of vehicle 906, such as seat positioning functions, cabin climate control functions, cabin lighting function, and the like.

Returning to FIG. 8, a detailed description of process 800 is now provided. At block 802, information generated in response to a transit request is received (e.g., at communication interfaces 314). The transit request is similar or the same as the transit request described above in block 402 of process 400. For example, a user device (e.g., user device 106) initiates a transit request to summon the vehicle towards a location associated with the user device. In some examples, a server system (e.g., server system 102) receives the transit request from the user device via a network (e.g., network 108) and in response, processes the transit request to dispatch the vehicle to the location associated with the user device (e.g., the pick-up location). In some examples, processing the transit request includes generating the information received at block 802 and sending the generated information to the dispatched vehicle. The information, when received by the dispatched vehicle, causes the vehicle to carry out the transit request. Specifically, the dispatched vehicle uses the received information to navigate to the pick-up location, authenticate the user/passenger(s) boarding at the pick-up location, and transport the passenger to the drop-off location. In addition, the vehicle uses the received information to establish a wireless communication connection with the user device, which enables information to be securely exchanged with the user device.

Although efforts are made to reduce the transfer of user information, when a transit request is initiated by a user, information that identifies a pick-up location, pick-up time, drop-off location, and the user device (such as a one-time anonymous ID), which are needed for the vehicle to find the user and to permit user access into the vehicle, are transmitted.

In some examples, the received information includes information required for the vehicle to carry out the transit request. For example, the received information includes the requested pick-up location, pick-up time, and drop-off location. In some examples, the received information includes first authentication information for enabling the vehicle to authenticate the user/passenger(s) boarding at the pick-up location. The first authentication information is used, for example, to verify that a device detected at the pick-up location corresponds to the user device that initiated the transit request. As will become apparent in the description below, access to the vehicle (e.g., by unlocking a cabin of the vehicle) is provided upon successfully verifying that a detected device corresponds to the user device that initiated the transit request.

In some examples, the first authentication information includes a first authentication key and/or first identification code of the user device. The first authentication key is, for example, a cryptographic key or passcode used to decrypt data (e.g., NFC data) received from the user device using a first wireless communication protocol (e.g., a short-range or ultra-short range wireless communication protocol). The first identification code of the user device is a unique identifier (e.g., text string) representing the user device. In one example, the first identification code includes the UID of an NFC interface (e.g., NFC interface of ultra-short range wireless communication interface 218) of the user device. User device provides the UID at its NFC interface when interacting with an NFC reader. In some examples, the UID of the first identification code is generated by the server system and delivered to the user device in response to the transit request.

In some examples, the received information of block 802 further includes second authentication information for enabling the vehicle to establish a wireless communication connection with the user device using a second wireless communication protocol (e.g., a short-range or medium-range wireless communication protocol). The second authentication information is, for example, different from first authentication information. In some examples, the second wireless communication protocol is different from the first wireless communication protocol. In some examples, the second authentication information includes credentials for establishing the wireless communication connection with the user device using the second wireless communication protocol. Establishing the wireless communication connection enables the user device to provide requests to control one or functionalities of the vehicle (e.g., controlling a setting of a seat region in the vehicle). The credentials include, for example, a second authentication key and/or second identification code associated with the dispatched vehicle. In a specific example, the credentials include a Bluetooth address and/or passcode associated with the user device, which enable the vehicle to establish a Bluetooth wireless communication connection with the user device.

In some examples, the first authentication key of the first authentication information is one of a pair of authentication keys generated by the server system in response to receiving the transit request from the user device. The pair of authentication keys include the first authentication key and a third authentication key. The first authentication key is capable of decrypting data encrypted by the third authentication key. The server system delivers the third authentication key to the user device where it is used by the user device to encrypt authentication information (e.g., third authentication information at block 804, described below) being sent to the vehicle. The server system also delivers the first authentication key to the vehicle as part of the first authentication information received at block 802. The vehicle uses the first authentication key to decrypt encrypted authentication information received from the user device (e.g., third authentication information received at block 804, described below). In some examples, the pair of authentication keys are uniquely generated by the server. For example, the pair of authentication keys are different from all other pairs of authentication keys previously assigned to user devices and vehicles in the fleet within a predetermined time period. In some examples, the first authentication key and the third authentication key are symmetric keys. In other examples, the first authentication key and the third authentication key are asymmetric keys (e.g., different keys).

In some examples, the first authentication key and/or third authentication key are invalidated after a predetermined amount of time (e.g., several hours or one day). For example, after the predetermined amount of time, the first authentication key would no longer be able to decrypt data encrypted using the third authentication key. The predetermined amount of time is, for example, with respect to a predetermined reference time, such as the time at which the transit request was initiated or the time at which the third authentication information was determined to correspond to the first authentication information (block 806). In some examples, the first authentication key and/or third authentication key are invalidated upon determining that the user/passenger has disembarked from the vehicle after boarding the vehicle and upon arriving at the drop-off location. In these examples, after determining that the user/passenger associated with the device has boarded the vehicle, the vehicle determines whether the user/passenger has disembarked from the vehicle. The determination is based on, for example, sensor data obtained from one or more sensors in the cabin of the vehicle. In accordance with determining that the user/passenger has disembarked from the vehicle, the first authentication key and/or third authentication key are invalidated.

At block 804, third authentication information is received (e.g., using ultra-short range wireless communication device 322) from a device external to the vehicle using the first wireless communication protocol (e.g., a short-range or ultra-short range wireless communication protocol). The device may or may not be the user device that initiated the transit request. The operations of block 804 are similar to those of block 408, described above, except that in the present example, the third authentication information is received by the dispatched vehicle from a detected device rather than received by the user device from a detected vehicle. The third authentication information includes, for example, a third identification code of the device. In particular, the third authentication information enable the vehicle to determine whether the device corresponds to the user device that initiated the transit request.

Block 804 includes performing a handshake procedure with the device using the first wireless communication protocol. The handshake procedure is similar to that described in block 408 of process 400, except that in the present example, the vehicle is the initiator of the handshake procedure and the device is the target of the handshake procedure. The handshake procedure includes, for example, detecting the device (e.g., an NFC interface of the device) using the first wireless communication protocol. In some examples, in response to detecting the device, the vehicle requests the third authentication information from the device using the first wireless communication protocol. In response to receiving the request for the third authentication information, the device sends the third authentication information to the vehicle.

In some examples, the third authentication information includes a third identification code of the detected device. In a specific example, the third identification code is a UID that is read from an NFC interface of the detected device. In some examples, the third authentication information is encrypted using a third authentication key (e.g., cryptographic key or passcode), which restricts access to the third identification code of the device. By way of example, the NFC interface of the detected device includes an encryption engine, which uses the third authentication key to encrypt the UID of its NFC interface. In these examples, the third authentication information includes the encrypted UID based on the third authentication key.

At block 806, a determination is made as to whether the third authentication information corresponds to the first authentication information. The operations of block 806 are similar to those of block 410, described above, except that the dispatched vehicle is authenticating a detected device in block 806 rather than the user device authenticating a detected vehicle in block 410. In particular, the determination of block 806 serves to establish whether or not the detected device corresponds to the user device that initiated the transit request. For example, determining that the third authentication information corresponds to the first authentication information establishes that the detected device corresponds to the user device. Conversely, determining that the third authentication information does not correspond to the first authentication information establishes that the detected device does not correspond the user device.

In some examples, the first authentication information received at block 802 includes a first identification code of the user device that initiated the transit request (e.g., UID from the NFC interface of the user device) and the third authentication information received at block 804 includes a third identification code of the detected device (e.g., UID read from the NFC interface of the detected device). In these examples, block 806 includes determining whether the third identification code of the detected device matches the first identification code of the user device that initiated the transit request. If the third identification code of the detected device is determined to match the first identification code of the user device, the third authentication information is determined to correspond to the first authentication information. Conversely, if the third identification code of the detected device is determined not to match the first identification code of the user device, the third authentication information is determined not to correspond to the first authentication information.

In examples where the third authentication information is encrypted, block 806 includes using the first authentication information to attempt to decrypt the third authentication information. For example, the first authentication key included in the first authentication information is used to decrypt the third authentication information. If the third authentication information is successfully decrypted using the first authentication key, the third authentication information is determined to correspond to the first authentication information. Conversely, if the third authentication information is not successfully decrypted using the first authentication key, the third authentication information is determined not to correspond to the first authentication information.

In accordance with determining that the third authentication information does not correspond to the first authentication information, process 800 returns back to block 804 where authentication information is, for example, received from another detected device and used to authenticate the other detected device. Additionally, in some examples, upon determining that the third authentication information does not correspond to the first authentication information, a notification is provided at the dispatched vehicle. The notification is, for example, an error notification (e.g., audio or visual notification) indicating that the detected device is not authorized to access the vehicle.

In accordance with determining that the third authentication information corresponds to the first authentication information, one or more of blocks 808-818 are performed. In some examples, one or more of blocks 808-818 are performed automatically upon determining that the third authentication information corresponds to the first authentication information and without requiring further input from the user. In some examples, one or more of blocks 808-814 are performed before block 804 or 806

At block 808, a cabin of the vehicle is unlocked (e.g., using peripheral interface 318). In some examples, the cabin is a passenger cabin of the vehicle and the vehicle unlocks and/or opens a door of the passenger cabin. In other examples, the cabin is a storage cabin (e.g., storage cabin 324) of the vehicle and the vehicle unlocks and/or opens an access point to the storage cabin.

At block 810, a driving route to a destination location (e.g., drop-off location) of the transit request is accessed. For example, upon determining at block 806 that the third authentication information corresponds to the first authentication information, a destination location associated with the first authentication information is determined from the information received at block 802. A driving route is then obtained based on the determined destination. For example, based on traffic information and other drop-off locations of existing passengers, the fastest driving route is obtained. The driving route is obtained, for example, using a navigation service of the vehicle or a third-party navigation service.

At block 812, a determination is made as to whether a user/passenger associated with the user device has boarded the vehicle. As described in block 416 of process 400 above, various techniques can be used to determine whether the user/passenger associated with the user device has boarded the vehicle. In some examples, the determination is made based on information obtained from one or more sensors in the passenger cabin of the vehicle. For example, information from infrared and/or pressure sensors at an entrance or seat region of the vehicle is used to determine whether the user/passenger has passed through the entrance of the vehicle or reached a seat region of the vehicle, which indicates that the user/passenger has boarded the vehicle. In some examples, image data from one or more image sensors in the passenger cabin is used to determine whether the user/passenger has boarded the vehicle.

In some examples, a communication device (e.g., NFC device) disposed within the cabin of the vehicle is used to determine whether the user/passenger has boarded the vehicle. The determination is based on, for example, detecting a wireless communication interaction (e.g., using the first wireless communication protocol) between the communication device and the user device. In some examples, the communication device is disposed along an aisle of the cabin or at a seat region of the vehicle. In some examples, the communication device is separate from a communication device of the vehicle used to receive the third authentication information at block 804.

Upon determining that the user/passenger has boarded the vehicle, one or more of blocks 814-818 are performed. In some examples, performance of one or more of blocks 814-818 is restricted (e.g., by the vehicle) until it is determined that the user/passenger has boarded the vehicle. For example, upon determining that the user/passenger has not boarded the vehicle, the vehicle restricts performance of one or more of blocks 814. By way of example, upon determining that the user/passenger has not boarded the vehicle, the vehicle does not: transmit or respond to a discovery signal to establish a wireless communication connection with the user device (block 814), process a request from the user device to change a setting of a seat region or apply predefined passenger cabin settings (block 816), or provide information for display on the user device (block 818).

At block 814, a wireless communication connection with the user device is established (e.g., with communication interfaces 314) using a second wireless communication protocol. The second wireless communication protocol is, for example, different from the first wireless communication protocol. In some examples, the second wireless communication protocol is a short-range or medium range wireless communication protocol. In some examples, the one or more functions of the vehicle are accessible to the device upon establishing the wireless communication connection. The one or more functions are, for example, functions associated with a seat region in the cabin (e.g., seat position functions, seat lighting functions, climate control functions of the seat region, media device functions of the seat region, etc.).

The operations of block 814 are similar to those of block 412, described above. In some examples, the wireless communication connection is established using the second authentication information received at block 802. For example, the second authentication information includes credentials used to establish the wireless communication connection with the user device. In other examples, the wireless communication connection is established using the first authentication information. The wireless communication connection is initiated either by the vehicle or the user device. In some examples, the established wireless communication connection is a direct connection (e.g., peer-to-peer connection) between the vehicle and the user device. Specifically, the established wireless communication connection is a single-hop, point-to-point wireless communication channel between the vehicle and the user device using the second wireless communication protocol.

In some examples, block 814 is performed prior to block 804, 806, or 812. For example, prior to the operations of block 804, 806, or 812, the vehicle detects the user device (or vice versa) using a discovery signal of the second wireless communication protocol. Detecting the user device or vehicle initiates the handshake procedure using the second wireless communication protocol and causes the wireless communication connection to be established between the user device and the vehicle. In these examples, the one or more functions of the vehicle are accessible to the device upon establishing the wireless communication connection and upon determining at block 812 that the upon determining that the user/passenger associated with the user device has boarded the vehicle.

At block 816, a request is received (e.g., using communication interfaces 314) from the user device using the second wireless communication protocol. The request is, for example, a control request to change a setting of a seat region in the passenger cabin of the vehicle. For example, the request is sent over the established wireless communication connection of block 814 and using the second wireless communication protocol. The request received at block 816 is analogous to the request of block 416, described above. In response to receiving the request, a setting of the seat region is changed in accordance with the request.

In some examples, block 816 includes receiving one or more predefined passenger cabin settings associated with the user device. The predefined passenger cabin settings are similar to those described above in block 416 of process 400. For example, the predefined passenger cabin settings are sent, consistent with the user's instruction or approval, over the established wireless communication connection of block 814 and using the second wireless communication protocol. In some examples, the predefined passenger cabin settings are received from the user device upon establishing the wireless communication connection at block 814. In some examples, the predefined passenger cabin settings are received from the user device, consistent with user's instruction or approval, upon determining that the third authentication information corresponds to the first authentication information at block 806. In some examples, the predefined passenger cabin settings are included in the information received at block 802. After receiving the predefined passenger cabin settings, the vehicle applies the predefined passenger cabin settings to a seat region of the cabin associated with the transit request.

In some examples, the vehicle does not respond to requests to change a setting of a seat region or apply predefined passenger cabin settings until after the user device is detected at the seat region. In these examples, block 816 includes determining whether the device is detected at the seat region. The determination is based on, for example, an interaction between the user device and a communication device (e.g., an NFC reader) disposed at the seat region of the vehicle. In some examples, the interaction is similar to the operations of blocks 804 and 806 using the first wireless communication protocol. In these examples, the user device is detected upon receiving information from the user device at the seat region (e.g., using the first wireless communication protocol) and authenticating that the received information corresponds to the user device.

At block 818, information is provided (e.g., using communication interfaces 314) to the user device for display. For example, information regarding a current transit route of the vehicle or an operation status of the vehicle is sent from the vehicle to the user device. The information is sent, for example, over the establishing wireless communication connection (e.g., block 814) and using the second wireless communication protocol. The information provided is similar to the information received at block 418, described above. In some examples, the information is not provided in response to a request from the user device. Rather, the information is automatically provided to the user device by the vehicle. In other examples, the information is received after a request is provided. For example, a request for the information is sent to the vehicle in response input received at the user device from the user. The request, when received by the vehicle, causes the vehicle to provide the information to the user device. Upon receiving the information from the vehicle, the information is displayed on a display of the user device.

Executable instructions for performing the methods and processes described herein are, optionally, included in a non-transitory computer-readable storage medium (e.g., non-transitory computer-readable storage medium of memory 210 or 320) or other computer program product configured for execution by one or more processors. Executable instructions for performing the methods and processes described herein are, optionally, included in a transitory computer-readable storage medium or other computer program product configured for execution by one or more processors.

As used in the description of the various described examples and the appended claims, the term "user" is construed to mean the person who interacts or interacted with the user device (e.g., user device 106 or 200) to cause the various aspects of user-to-vehicle interaction described herein to be performed. In accordance with some examples described herein, the "user" of a user device is the person who interacts or interacted with the user device to initiate a transit request and summon a vehicle to a requested location. In some examples, the "user" of the user device is the person corresponding to a user profile stored in the user device. In addition, the term "passenger" of a vehicle is construed to mean a person who is boarding or has boarded the vehicle for a journey. In some examples described herein, the "passenger" and the "user" are the same person. For example, the user of a user device who interacted with the user device to initiated a transit request and summon a vehicle to a requested location is also the passenger of the summoned vehicle when he/she is boarding or has boarded the summoned vehicle to reach a requested destination. However, in other examples, the "passenger" is not the same person as the "user." For example, a person who is boarding or has boarded a vehicle ("passenger") may not necessarily be the person who interacted with a user device to summon the vehicle to a requested location ("user").

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

The above-described embodiments contemplate using data to improve the handling of transit requests and the providing of transit services (including associated user-to-vehicle interactions). In some examples, the data used may include a user's identity (e.g. name), location (e.g., where they wish to be picked up or dropped off), contact (e.g., phone number), so forth. In some examples, the data may be used to infer user preferences (e.g., pick up from premium location at airport), commute habits, so forth. This information can be used to the benefit of users and in some instances—such as information sufficient to confirm the identity of a user—is a necessary requirement. This information can also be used to more efficiently handle transit requests and improve the quality of transit services provided (including the quality of associated user-to-vehicle interactions and the providing of transit services that better match the user's transit preferences).

Entities that collect, analyze, disclose, transfer, store, or otherwise use information of this nature should comply with well-established privacy policies and/or privacy practices, including those generally recognized as meeting or exceeding industry or governmental requirements for maintaining data security and privacy, which may be country specific.

In addition, the present technology may be implemented in ways that allow users to selectively block the use of, or access to, data when possible. For example, in the case of handling transit requests and providing transit services, the present technology can be configured to allow users to select to "opt in" or "opt out" of participation in the collection of personal information data during registration for services or anytime thereafter. In another example, users can select not to provide some or all of the types of collected personal information data. In yet another example, users can select to limit the length of time personal information data is maintained or entirely prohibit the development of a user profile (e.g., a user profile storing user preferences for a seat position setting, a light setting, a climate control setting, a media device setting, etc.). In addition to providing "opt in" and "opt out" options, the present disclosure contemplates providing notifications relating to the access or use of personal information. For instance, a user may be notified upon downloading an app (e.g., a transit app) that their personal information data will be accessed and then reminded again just before personal information data is accessed by the app.

What is claimed is:

1. An electronic device, comprising:
one or more processors;
a memory; and
one or more programs, wherein the one or more programs are stored in the memory and configured to be executed by the one or more processors, the one or more programs including instructions for:
  initiating a transit request, wherein the transit request requests dispatch of a vehicle to a location of the electronic device;
  receiving, from an external device, information in response to the transit request, wherein the information includes first authentication information;
  establishing, using a first wireless communication protocol, a first wireless communication channel with the vehicle, wherein communicating via the first wireless communication channel requires that the electronic device is within a first communication range from the vehicle;
  receiving, from the vehicle, via the first wireless communication channel, second authentication information; and
  in accordance with a determination that the second authentication information corresponds to the first authentication information:
    establishing, using a second wireless communication protocol different from the first wireless communication protocol, a second wireless communication channel with the vehicle, wherein communicating via the second wireless communication channel requires that the electronic device is within a second communication range, different from the first communication range, from the vehicle; and
    sending, to the vehicle, via the second wireless communication channel, an instruction to unlock a cabin of the vehicle.

2. The electronic device of claim 1, wherein the first communication range is larger than the second communication range.

3. The electronic device of claim 2, wherein the first wireless communication channel is WiFi or cellular network communication, and wherein the second wireless communication channel is Bluetooth communication or Near Field Communication (NFC).

4. The electronic device of claim 2, wherein the first wireless communication channel is Bluetooth communication and the second wireless communication channel is Near Field Communication (NFC).

5. The electronic device of claim 1, wherein one or more functions of the vehicle, other than unlocking the cabin, are accessible to the electronic device using the second wireless communication channel.

6. The electronic device of claim 1, wherein the information received in response to the transit request further includes third authentication information, wherein the third authentication information is different from the first authentication information, and
wherein the second wireless communication protocol is established using the third authentication information.

7. The electronic device of claim 1, wherein the one or more programs further include instructions for:
receiving, from the vehicle, using one or more of the first wireless communication channel and second wireless communication channel, information regarding a current transit route of the vehicle and/or an operation status of the vehicle; and
displaying content based on the received information regarding the current transit route of the vehicle and/or the operation status of the vehicle.

8. A non-transitory computer-readable storage medium storing one or more programs configured to be executed by one or more processors of an electronic device, the one or more programs including instructions for:
initiating a transit request, wherein the transit request requests dispatch of a vehicle to a location of the electronic device;
receiving, from an external device, information in response to the transit request, wherein the information includes first authentication information;
establishing, using a first wireless communication protocol, a first wireless communication channel with the vehicle, wherein communicating via the first wireless communication channel requires that the electronic device is within a first communication range from the vehicle;
receiving, from the vehicle, via the first wireless communication channel, second authentication information; and
in accordance with a determination that the second authentication information corresponds to the first authentication information:
establishing, using a second wireless communication protocol different from the first wireless communication protocol, a second wireless communication channel with the vehicle, wherein communicating via the second wireless communication channel requires that the electronic device is within a second communication range, different from the first communication range, from the vehicle; and
sending, to the vehicle, via the second wireless communication channel, an instruction to unlock a cabin of the vehicle.

9. A method, comprising:
at an electronic device having a processor and memory:
initiating a transit request, wherein the transit request requests dispatch of a vehicle to a location of the electronic device;
receiving, from an external device, information in response to the transit request, wherein the information includes first authentication information;
establishing, using a first wireless communication protocol, a first wireless communication channel with the vehicle, wherein communicating via the first wireless communication channel requires that the electronic device is within a first communication range from the vehicle;
receiving, from the vehicle, via the first wireless communication channel, second authentication information; and
in accordance with a determination that the second authentication information corresponds to the first authentication information:
establishing, using a second wireless communication protocol different from the first wireless communication protocol, a second wireless communication channel with the vehicle, wherein communicating via the second wireless communication channel requires that the electronic device is within a second communication range, different from the first communication range, from the vehicle; and
sending, to the vehicle, via the second wireless communication channel, an instruction to unlock a cabin of the vehicle.

10. The non-transitory computer-readable storage medium of claim 8, wherein the first communication range is larger than the second communication range.

11. The non-transitory computer-readable storage medium of claim 10, wherein the first wireless communication channel is WiFi or cellular network communication, and wherein the second wireless communication channel is Bluetooth communication or Near Field Communication.

12. The non-transitory computer-readable storage medium of claim 10, wherein the first wireless communication channel is Bluetooth communication and the second wireless communication channel is Near Field Communication (NFC).

13. The non-transitory computer-readable storage medium of claim 8, wherein one or more functions of the vehicle, other than unlocking the cabin, are accessible to the electronic device using the second wireless communication channel.

14. The non-transitory computer-readable storage medium of claim 8, wherein the information received in response to the transit request further includes third authentication information, wherein the third authentication information is different from the first authentication information, and
wherein the second wireless communication protocol is established using the third authentication information.

15. The non-transitory computer-readable storage medium of claim 8, wherein the one or more programs further include instructions for:
receiving, from the vehicle, using one or more of the first wireless communication channel and second wireless communication channel, information regarding a current transit route of the vehicle and/or an operation status of the vehicle; and
displaying content based on the received information regarding the current transit route of the vehicle and/or the operation status of the vehicle.

16. The method of claim 9, wherein the first communication range is larger than the second communication range.

17. The method of claim 16, wherein the first wireless communication channel is WiFi or cellular network communication, and wherein the second wireless communication channel is Bluetooth communication or Near Field Communication.

18. The method of claim 16, wherein the first wireless communication channel is Bluetooth communication and the second wireless communication channel is Near Field Communication (NFC).

19. The method of claim 9, wherein one or more functions of the vehicle, other than unlocking the cabin, are accessible to the electronic device using the second wireless communication channel.

20. The method of claim 9, wherein the information received in response to the transit request further includes third authentication information, wherein the third authentication information is different from the first authentication information, and
- wherein the second wireless communication protocol is established using the third authentication information.

21. The method of claim 9, further comprising:
- receiving, from the vehicle, using one or more of the first wireless communication channel and second wireless communication channel, information regarding a current transit route of the vehicle and/or an operation status of the vehicle; and
- displaying content based on the received information regarding the current transit route of the vehicle and/or the operation status of the vehicle.

* * * * *